(12) United States Patent
Richley et al.

(10) Patent No.: US 10,310,052 B2
(45) Date of Patent: Jun. 4, 2019

(54) METHOD, APPARATUS, AND COMPUTER PROGRAM PRODUCT FOR REAL TIME LOCATION SYSTEM REFERENCING IN PHYSICALLY AND RADIO FREQUENCY CHALLENGED ENVIRONMENTS

(71) Applicant: Zebra Technologies Corporation, Lincolnshire, IL (US)

(72) Inventors: Edward A. Richley, Gaithersburg, MD (US); Belinda Turner, Germantown, MD (US); Chang Wang, Boyds, MD (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 15/492,537

(22) Filed: Apr. 20, 2017

(65) Prior Publication Data

US 2017/0219683 A1    Aug. 3, 2017

Related U.S. Application Data

(63) Continuation of application No. 14/678,080, filed on Apr. 3, 2015, now Pat. No. 9,661,455.
(Continued)

(51) Int. Cl.
*H04W 4/02* (2018.01)
*G01S 5/06* (2006.01)
*H04L 12/24* (2006.01)
*H04B 1/16* (2006.01)
*G01S 5/02* (2010.01)

(52) U.S. Cl.
CPC ............... *G01S 5/06* (2013.01); *G01S 5/021* (2013.01); *G01S 5/0236* (2013.01); *H04B 1/16* (2013.01); *H04L 41/0803* (2013.01); *H04W 4/02* (2013.01)

(58) Field of Classification Search
CPC ................................. G01S 5/021; G01S 1/026
See application file for complete search history.

(56) References Cited

U.S. PATENT DOCUMENTS 3,732,500 A    5/1973    Dishal et al.
4,270,145 A    5/1981    Farina
(Continued)

FOREIGN PATENT DOCUMENTS

EP    1235077 A2    8/2002
EP    1241616 A2    9/2002
(Continued)

OTHER PUBLICATIONS

Marchant, "Secure Animal Identification and Source Verification", JM Communications, UK, 2002.
(Continued)

*Primary Examiner* — Thomas J Lett

(57) ABSTRACT

Systems, methods, apparatuses, and computer readable media are disclosed for improving, in some examples, reference in a location system. In one embodiment, a method is provided comprising: receiving reference tag blink data from a plurality of receivers; calculating, using a processor, a reference phase offset between the plurality of receivers; and generating a suspended reference phase offset table, wherein a suspended reference phase offset table is generated by causing the reference phase offset to be stored in a memory for later tag location calculations.

15 Claims, 10 Drawing Sheets

Related U.S. Application Data

(60) Provisional application No. 62/008,298, filed on Jun. 5, 2014.

(56) References Cited

U.S. PATENT DOCUMENTS

| | | | |
|---|---|---|---|
| 5,046,133 A | 9/1991 | Watanabe et al. | |
| 5,119,104 A | 6/1992 | Heller | |
| 5,469,409 A | 11/1995 | Anderson et al. | |
| 5,513,854 A | 5/1996 | Daver | |
| 5,621,417 A * | 4/1997 | Hassan | G01S 13/825 342/457 |
| 5,645,077 A | 7/1997 | Foxlin | |
| 5,699,244 A | 12/1997 | Clark, Jr. et al. | |
| 5,901,172 A | 5/1999 | Fontana et al. | |
| 5,920,287 A | 7/1999 | Belcher et al. | |
| 5,930,741 A | 7/1999 | Kramer | |
| 5,995,046 A | 11/1999 | Belcher et al. | |
| 3,028,626 A | 2/2000 | Aviv | |
| 6,121,926 A | 9/2000 | Belcher et al. | |
| 6,176,837 B1 | 1/2001 | Foxlin | |
| 6,204,813 B1 | 3/2001 | Wadell et al. | |
| 6,313,789 B1 * | 11/2001 | Zhodzishsky | G01S 19/29 342/357.68 |
| 6,366,242 B1 | 4/2002 | Boyd et al. | |
| 6,380,894 B1 | 4/2002 | Boyd et al. | |
| 6,542,083 B1 * | 4/2003 | Richley | G01S 5/16 340/10.42 |
| 6,593,885 B2 | 7/2003 | Wisherd et al. | |
| 6,655,582 B2 | 12/2003 | Wohl et al. | |
| 6,710,713 B1 | 3/2004 | Russo | |
| 6,812,884 B2 | 11/2004 | Richley et al. | |
| 6,836,744 B1 | 12/2004 | Asphahani et al. | |
| 6,882,315 B2 | 4/2005 | Richley et al. | |
| 7,009,638 B2 | 3/2006 | Gruber et al. | |
| 7,190,271 B2 | 3/2007 | Boyd | |
| 7,263,133 B1 | 8/2007 | Miao | |
| 7,667,604 B2 | 2/2010 | Ebert et al. | |
| 7,671,802 B2 | 3/2010 | Walsh et al. | |
| 7,710,322 B1 | 5/2010 | Ameti et al. | |
| 7,739,076 B1 | 6/2010 | Vock et al. | |
| 7,755,541 B2 | 7/2010 | Wisherd et al. | |
| 7,899,006 B2 | 3/2011 | Boyd | |
| 7,969,348 B2 | 6/2011 | Baker et al. | |
| 8,009,727 B2 | 8/2011 | Hui et al. | |
| 8,023,917 B2 | 9/2011 | Popescu | |
| 8,041,369 B2 * | 10/2011 | Smith | H04B 3/542 455/456.1 |
| 8,077,981 B2 | 12/2011 | Elangovan et al. | |
| 8,269,835 B2 | 9/2012 | Grigsby et al. | |
| 8,279,051 B2 | 10/2012 | Khan | |
| 8,289,185 B2 | 10/2012 | Alonso | |
| 8,457,392 B2 | 6/2013 | Cavallaro et al. | |
| 8,477,046 B2 | 7/2013 | Alonso | |
| 8,568,278 B2 | 10/2013 | Riley et al. | |
| 8,665,152 B1 | 3/2014 | Kling et al. | |
| 8,696,458 B2 | 4/2014 | Foxlin et al. | |
| 8,705,671 B2 | 4/2014 | Ameti et al. | |
| 8,775,916 B2 | 7/2014 | Pulsipher et al. | |
| 8,780,204 B2 | 7/2014 | DeAngelis et al. | |
| 8,795,045 B2 | 8/2014 | Sorrells et al. | |
| 8,842,002 B2 | 9/2014 | Rado | |
| 8,989,880 B2 | 3/2015 | Wohl et al. | |
| 9,081,076 B2 | 7/2015 | DeAngelis et al. | |
| 9,381,645 B1 | 7/2016 | Yarlagadda et al. | |
| 2001/0010541 A1 | 8/2001 | Fernandez et al. | |
| 2001/0030625 A1 | 10/2001 | Doles et al. | |
| 2002/0004398 A1 | 1/2002 | Ogino et al. | |
| 2002/0041284 A1 | 4/2002 | Konishi et al. | |
| 2002/0114493 A1 | 8/2002 | McNitt et al. | |
| 2002/0116147 A1 | 8/2002 | Vock et al. | |
| 2002/0130835 A1 | 9/2002 | Brosnan | |
| 2002/0135479 A1 | 9/2002 | Belcher et al. | |
| 2003/0090387 A1 | 5/2003 | Lestienne et al. | |
| 2003/0095186 A1 | 5/2003 | Aman et al. | |
| 2003/0128100 A1 | 7/2003 | Burkhardt et al. | |
| 2003/0163287 A1 | 8/2003 | Vock et al. | |
| 2003/0227453 A1 | 12/2003 | Beier et al. | |
| 2004/0022227 A1 | 2/2004 | Lynch et al. | |
| 2004/0062216 A1 | 4/2004 | Nicholls et al. | |
| 2004/0108954 A1 | 6/2004 | Richley et al. | |
| 2004/0178960 A1 | 9/2004 | Sun | |
| 2004/0249969 A1 | 12/2004 | Price | |
| 2004/0260470 A1 | 12/2004 | Rast | |
| 2004/0260828 A1 | 12/2004 | Price | |
| 2005/0026563 A1 | 2/2005 | Leeper et al. | |
| 2005/0031043 A1 | 2/2005 | Paquelet | |
| 2005/0059998 A1 | 3/2005 | Norte et al. | |
| 2005/0075079 A1 | 4/2005 | Jei et al. | |
| 2005/0093976 A1 | 5/2005 | Valleriano et al. | |
| 2005/0148281 A1 | 7/2005 | Sanchez-Castro et al. | |
| 2005/0207617 A1 | 9/2005 | Sarnoff | |
| 2006/0067324 A1 | 3/2006 | Kim et al. | |
| 2006/0139167 A1 | 6/2006 | Davie et al. | |
| 2006/0164213 A1 | 7/2006 | Burghard et al. | |
| 2006/0252476 A1 | 11/2006 | Bahou | |
| 2006/0271912 A1 | 11/2006 | Mickle et al. | |
| 2006/0281061 A1 | 12/2006 | Hightower et al. | |
| 2007/0091292 A1 | 4/2007 | Cho et al. | |
| 2007/0176749 A1 | 8/2007 | Boyd | |
| 2007/0296723 A1 | 12/2007 | Williams | |
| 2008/0065684 A1 | 3/2008 | Zilberman | |
| 2008/0106381 A1 | 5/2008 | Adamec et al. | |
| 2008/0113787 A1 | 5/2008 | Alderucci et al. | |
| 2008/0129825 A1 | 6/2008 | DeAngelis et al. | |
| 2008/0140233 A1 | 6/2008 | Seacat | |
| 2008/0186231 A1 | 8/2008 | Aljadeff et al. | |
| 2008/0204248 A1 | 8/2008 | Winget et al. | |
| 2008/0262885 A1 | 10/2008 | Jain et al. | |
| 2008/0266131 A1 | 10/2008 | Richardson et al. | |
| 2008/0269016 A1 | 10/2008 | Ungari et al. | |
| 2008/0281443 A1 | 11/2008 | Rodgers | |
| 2008/0285805 A1 | 11/2008 | Luinge et al. | |
| 2008/0291024 A1 | 11/2008 | Zhang et al. | |
| 2009/0048044 A1 | 2/2009 | Oleson et al. | |
| 2009/0110134 A1 * | 4/2009 | Yuan | G01S 19/30 375/371 |
| 2009/0231198 A1 | 9/2009 | Walsh et al. | |
| 2010/0026809 A1 | 2/2010 | Curry | |
| 2010/0045508 A1 | 2/2010 | Ekbal et al. | |
| 2010/0054304 A1 | 3/2010 | Barnes et al. | |
| 2010/0060452 A1 | 3/2010 | Schuster et al. | |
| 2010/0150117 A1 | 6/2010 | Aweya et al. | |
| 2010/0250305 A1 | 9/2010 | Lee et al. | |
| 2010/0278386 A1 | 11/2010 | Hoeflinger | |
| 2010/0283630 A1 | 11/2010 | Alonso | |
| 2010/0328073 A1 | 12/2010 | Nikitin et al. | |
| 2011/0025847 A1 | 2/2011 | Park et al. | |
| 2011/0054782 A1 | 3/2011 | Kaahui | |
| 2011/0063114 A1 | 3/2011 | Ikoyan | |
| 2011/0064023 A1 | 3/2011 | Yamamoto et al. | |
| 2011/0084806 A1 | 4/2011 | Perkins | |
| 2011/0134240 A1 | 6/2011 | Anderson et al. | |
| 2011/0140970 A1 | 6/2011 | Fukagawa et al. | |
| 2011/0169959 A1 | 7/2011 | DeAngelis et al. | |
| 2011/0261195 A1 | 10/2011 | Martin et al. | |
| 2011/0285585 A1 * | 11/2011 | Bergamo | G01S 5/0072 342/357.31 |
| 2011/0300905 A1 | 12/2011 | Levi | |
| 2011/0320322 A1 | 12/2011 | Roslak et al. | |
| 2012/0014278 A1 | 1/2012 | Ameti et al. | |
| 2012/0024516 A1 | 2/2012 | Bhadurt et al. | |
| 2012/0057634 A1 | 3/2012 | Shi et al. | |
| 2012/0057640 A1 | 3/2012 | Shi et al. | |
| 2012/0065483 A1 | 3/2012 | Chung | |
| 2012/0081531 A1 | 4/2012 | DeAngelis et al. | |
| 2012/0112904 A1 | 5/2012 | Nagy | |
| 2012/0126973 A1 | 5/2012 | DeAngelis et al. | |
| 2012/0139708 A1 | 6/2012 | Paradiso et al. | |
| 2012/0184878 A1 | 7/2012 | Najafi et al. | |
| 2012/0212505 A1 | 8/2012 | Burroughs et al. | |
| 2012/0218301 A1 | 8/2012 | Miller | |
| 2012/0225676 A1 | 9/2012 | Boyd et al. | |
| 2012/0231739 A1 | 9/2012 | Chen et al. | |

(56) References Cited

U.S. PATENT DOCUMENTS

| | | |
|---|---|---|
| 2012/0246795 A1 | 10/2012 | Scheffler et al. |
| 2012/0256745 A1 | 10/2012 | Piett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0041590 A1 | 2/2013 | Burich et al. |
| 2013/0066448 A1 | 3/2013 | Alonso |
| 2013/0076645 A1 | 3/2013 | Anantha et al. |
| 2013/0093625 A1 | 4/2013 | Smith |
| 2013/0096704 A1 | 4/2013 | Case, Jr. |
| 2013/0115904 A1 | 5/2013 | Kapoor et al. |
| 2013/0138386 A1 | 5/2013 | Jain et al. |
| 2013/0142384 A1 | 6/2013 | Ofek |
| 2013/0147608 A1 | 6/2013 | Sadr |
| 2013/0202062 A1 | 8/2013 | Sadr et al. |
| 2013/0257598 A1 | 10/2013 | Kawaguchi et al. |
| 2013/0268185 A1 | 10/2013 | Rabbath et al. |
| 2013/0339156 A1 | 12/2013 | Sanjay et al. |
| 2014/0055588 A1 | 2/2014 | Bangera et al. |
| 2014/0145828 A1 | 5/2014 | Bassan-Eskenazi et al. |
| 2014/0156036 A1 | 6/2014 | Huang |
| 2014/0170607 A1 | 6/2014 | Hsiao et al. |
| 2014/0221137 A1 | 8/2014 | Krysiak et al. |
| 2014/0301427 A1 | 10/2014 | Khalaf-Allah |
| 2014/0320660 A1 | 10/2014 | DeAngelis et al. |
| 2014/0361875 A1 | 12/2014 | O'Hagan et al. |
| 2014/0361906 A1 | 12/2014 | Hughes et al. |
| 2014/0361909 A1 | 12/2014 | Stelfox et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0097653 A1 | 4/2015 | Gibbs et al. |
| 2015/0148129 A1 | 5/2015 | Austerlade et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0379387 A1 | 12/2015 | Richley |
| 2016/0097837 A1 | 4/2016 | Richley et al. |

FOREIGN PATENT DOCUMENTS

| | | |
|---|---|---|
| EP | 1253438 A2 | 10/2002 |
| EP | 1503513 A1 | 2/2005 |
| EP | 2474939 A1 | 7/2012 |
| WO | 98/05977 A1 | 2/1998 |
| WO | 99/61936 A1 | 12/1999 |
| WO | 01/08417 A1 | 2/2001 |
| WO | 2006/022548 A1 | 3/2006 |
| WO | 2010/083943 A1 | 7/2010 |
| WO | 2015/051813 A1 | 4/2014 |
| WO | 2014/197600 A1 | 12/2014 |

OTHER PUBLICATIONS

Guéziec, "Tracking a Baseball Pitch for Broadcast Television," Computer, Mar. 2002, pp. 38-43 [http://www.trianglesoftware.com/pitch_tracking.htm].

"RFID in the Australian Meat and Livestock Industry", Allflex Australia Pty Ltd, Capalaba, QLD (AU), Data Capture Suppliers Guide, 2003-2004.

"A Guide to Using NLIS Approved Ear Tags and Rumen Boluses", National Livestock Identification Scheme, Meat & Livestock Australia Limited, North Sydney, Australia, May 2003.

Fontana et al., "Commercialization of an Ultra Wideband Precision Asset Location System", 2003 IEEE Conference on Ultra Wideband Systems and Technologies, Nov. 16-19, 2003.

Zhu et al., "A Real Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

CattleLog Pro, eMerge Interactive, Inc., Sebastian, FL, 2004.

King, "NAIS Cattle ID Pilot Projects Not Needed, Since Proven Advanced Technology Already Exists", ScoringSystem, Inc., Sarasota, FL, Dec. 27, 2005. [www.prweb.com/releases/2005/12prweb325888.htm].

Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.

Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.

Guvenc et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.

Swedberg, "N.J. Company Seeks to Market Passive Sensor RFID Tags," RFID Journal, Jun. 14, 2011, pp. 1-2 [http://www.rfidjournal.com/articles/pdf?8527].

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).

Bahle et al., "I See You: How to Improve Wearable Activity Recognition by Leveraging Information from Environmental Cameras," Pervasive Computing and Communications Workshops, IEEE International Conference, (Mar. 18-22, 2013).

Swedberg, "USDA Researchers Develop System to Track Livestock Feeding Behavior Unobtrusively", RFID Journal, Jul. 18, 2013.

U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects."

Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.

U.S. Appl. No. 14/296,703, filed Jun. 5, 2014; In re: Alonso et al., entitled "Method and Apparatus for Associating Radio Frequency Identification Tags with Participants".

International Search Report and Written Opinion for International Application No. PCT/US2014/041062 dated Oct. 1, 2014.

International Search Report and Written Opinion for International Application No. PCT/US2014/040947 dated Oct. 9, 2014.

International Search Report and Written Opinion for International Application No. PCT/US2014/040881 dated Nov. 4, 2014.

International Search Report and Written Opinion for International Application No. PCT/US2014/049040 dated Dec. 17, 2014.

International Search Report and Written Opinion for International Application No. PCT/US2014/053647 dated Dec. 19, 2014.

Complaint before the United States District Court of Massachusetts, Civil Action No. 1:15-cv-12297, *Lynx System Developers, Inc.* et al. v. *Zebra Enterprise Solutions Corporation* et al., filed Jun. 10, 2015.

International Search Report and Written Opinion for International Application No. PCT/IB2015/054213 dated Aug. 6, 2015.

International Search Report and Written Opinion for International Application No. PCT/IB2015/054103 dated Aug. 14, 2015.

International Search Report and Written Opinion for International Application No. PCT/US2015/034267 dated Sep. 25, 2015.

Invitation to Pay Additional Fees/Partial International Search Report for PCT/IB2015/054099 dated Oct. 6, 2015.

International Search Report and Written Opinion for International Application PCT/IB2015/054102 dated Nov. 4, 2015.

International Search Report and Written Opinion for International Application No. PCT/IB2015/054099 dated Dec. 9, 2015.

"Seattleite wins top prize in Microsoft's Super Bowl tech Contest", San Francisco AP, Komonews.com, Feb. 6, 2016. [http://komonews.com/news/local/seattleite-wins-top-prize-in-microsofts-super-bowl-tech-contest].

International Search Report and Written Opinion for International Application No. PCT/IB2015/059264 dated Feb. 10, 2016.

(56) References Cited

OTHER PUBLICATIONS

Complaint before the United States District Court of Massachusetts, Civil Action No. 1:15-cv-12297, *Lynx System Developers, Inc.* et al. v. *Zebra Enterprise Solutions Corporation* et al., filed Mar. 23, 2016.
Defendant's Answer to Complaint before the United States District Court of Massachusetts, Civil Action No. 1:15-cv-12297, *Lynx System Developers, Inc.* et al. v. *Zebra Enterprise Solutions Corporation* et al., filed Apr. 6, 2016.
International Search Report for International Application No. PCT/US2016/035614 dated Sep. 15, 2016.

\* cited by examiner

|      | Rx1  | Rx2  | Rx3  | Rx4  | Rx5  | Rx6  | Rx7  | Rx8  | Rx9  | Rx10 | Rxn  |
|------|------|------|------|------|------|------|------|------|------|------|------|
| Rx1  |      | 1,2  | 1,3  | 1,4  | 1,5  | 1,6  | 1,7  | 1,8  | 1,9  | 1,10 | 1,n  |
| Rx2  | 2,1  |      | 2,3  | 2,4  | 2,5  | 2,6  | 2,7  | 2,8  | 2,9  | 2,10 | 2,n  |
| Rx3  | 3,1  | 3,2  |      | 3,4  | 3,5  | 3,6  | 3,7  | 3,8  | 3,9  | 3,10 | 3,n  |
| Rx4  | 4,1  | 4,2  | 4,3  |      | 4,5  | 4,6  | 4,7  | 4,8  | 4,9  | 4,10 | 4,n  |
| Rx5  | 5,1  | 5,2  | 5,3  | 5,4  |      | 5,6  | 5,7  | 5,8  | 5,9  | 5,10 | 5,n  |
| Rx6  | 6,1  | 6,2  | 6,3  | 6,4  | 6,5  |      | 6,7  | 6,8  | 6,9  | 6,10 | 6,n  |
| Rx7  | 7,1  | 7,2  | 7,3  | 7,4  | 7,5  | 7,6  |      | 7,8  | 7,9  | 7,10 | 7,n  |
| Rx8  | 8,1  | 8,2  | 8,3  | 8,4  | 8,5  | 8,6  | 8,7  |      | 8,9  | 8,10 | 8,n  |
| Rx9  | 9,1  | 9,2  | 9,3  | 9,4  | 9,5  | 9,6  | 9,7  | 9,8  |      | 9,10 | 9,n  |
| Rx10 | 10,1 | 10,2 | 10,3 | 10,4 | 10,5 | 10,6 | 10,7 | 10,9 | 10,9 |      | 10,n |
| Rxn  | n,1  | n,2  | n,3  | n,4  | n,5  | n,6  | n,7  | n,8  | n,9  | n,10 |      |

Figure 8

METHOD, APPARATUS, AND COMPUTER PROGRAM PRODUCT FOR REAL TIME LOCATION SYSTEM REFERENCING IN PHYSICALLY AND RADIO FREQUENCY CHALLENGED ENVIRONMENTS

CROSS-REFERENCE TO RELATED APPLICATION

This patent arises from a continuation of U.S. patent application Ser. No. 14/678,080, filed Apr. 3, 2015, now U.S. Pat. No. 9,661,455, which claims priority from and the benefit of the filing date of U.S. Provisional Patent Application No. 62/008,298 filed Jun. 5, 2014, both of which are incorporated by reference in their entireties herein.

FIELD

Embodiments discussed herein are related to radio frequency locating and, more particularly, to systems, methods, apparatus, computer readable media for real time location system (RTLS) referencing in physically and radio frequency (RF) challenged environments.

BACKGROUND

A number of deficiencies and problems associated with RTLS referencing are identified herein. Through applied effort, ingenuity, and innovation, exemplary solutions to many of these identified problems are embodied by the present invention, which is described in detail below.

BRIEF SUMMARY

Systems, methods, apparatus, and computer readable media are disclosed for providing RTLS referencing in physically or RF challenged environments as herein described.

In an embodiment, a method is provided including receiving reference tag blink data from a plurality of receivers; calculating, using a processor, a reference phase offset between the plurality of receivers; analyzing a plurality of reference phase offset calculations for at least one reference tag receiver pair over a time interval; and generating a suspended reference phase offset table in an instance in which the plurality of reference phase offset calculations for the at least one reference tag receiver pair satisfy a stability threshold, wherein a suspended reference phase offset table is generated by causing the reference phase offset to be stored in a memory for later tag location calculations. In some embodiments of the method the reference phase offset is the difference between a reference clock time at receipt of the reference tag blink data at a respective plurality of receivers. In some embodiments the method also includes receiving tag blink data; and calculating a tag location data, wherein calculating the tag location data is based on a time difference of arrival of the tag data at the plurality of receivers and adding the reference phase offset of the suspended reference phase offset table.

In some embodiments the method may further include determining a radio frequency receiving period with low radio frequency interference, wherein the radio frequency receiving period comprises a period in which radio frequency interference satisfies a predetermined threshold. In some embodiments the method also includes determining a radio frequency receiving period with low physical interference, wherein the radio frequency receiving period comprises a period in which physical interference satisfies a predetermined threshold. In some embodiments an apparatus is provided including a processor and a memory including computer program code, the memory and computer program code configured to, with the processor, cause the apparatus to receive reference tag blink data from a plurality of receivers; calculate a reference phase offset between the plurality of receivers; analyze a plurality of reference phase offset calculations for at least one reference tag receiver pair over a time interval; and generate a suspended reference phase offset table in an instance in which the plurality of reference phase offset calculations for the at least one reference tag receiver pair satisfy a stability threshold, wherein a suspended reference phase offset table is generated by causing the reference phase offset to be stored in a memory for later tag location calculations.

In some embodiments of the apparatus the reference phase offset is the difference between a reference clock time at receipt of the reference tag blink data at a respective plurality of receivers. In some embodiments of the apparatus the memory and computer program code are further configured to, with the processor, cause the apparatus to receive tag blink data; and calculate a tag location data, wherein calculating the tag location data is based on a time difference of arrival of the tag data at the plurality of receivers and adding the reference phase offset of the suspended reference phase offset table.

In some embodiments of the apparatus the memory and computer program code are further configured to, with the processor, cause the apparatus to determine an radio frequency receiving period with low radio frequency interference, wherein the radio frequency receiving period comprises a period in which radio frequency interference satisfies a predetermined threshold. In some embodiments of the apparatus the memory and computer program code are further configured to, with the processor, cause the apparatus to determine an radio frequency receiving period with low physical interference, wherein the radio frequency receiving period comprises a period in which physical interference satisfies a predetermined threshold.

In some embodiments a computer program product is provided including a non-transitory computer readable medium having program code portions stored thereon, the program code portions configured, upon execution to receive reference tag blink data from a plurality of receivers; calculate a reference phase offset between the plurality of receivers; analyze a plurality of reference phase offset calculations for at least one reference tag receiver pair over a time interval; and generate a suspended reference phase offset table in an instance in which the plurality of reference phase offset calculations for the at least one reference tag receiver pair satisfy a stability threshold, wherein a suspended reference phase offset table is generated by causing the reference phase offset to be stored in a memory for later tag location calculations.

In some embodiments of the computer program product the reference phase offset is the difference between a reference clock time at receipt of the reference tag blink data at a respective plurality of receivers. In some embodiments of the computer program product the program code portions are further configured, upon execution, to receive tag blink data; and calculate a tag location data, wherein calculating the tag location data is based on a time difference of arrival of the tag data at the plurality of receivers and adding the reference phase offset of the suspended reference phase offset table.

In some embodiments of the computer program product the program code portions are further configured, upon execution, to determine a radio frequency receiving period with low radio frequency interference, wherein the radio frequency receiving period comprises a period in which radio frequency interference satisfies a predetermined threshold. In some embodiments of the computer program product the program code portions are further configured, upon execution, to determine a radio frequency receiving period with low physical interference, wherein the radio frequency receiving period comprises a period in which physical interference satisfies a predetermined threshold.

In some embodiments a method is provided including receiving environmental data from a plurality of receivers; calculating, using a processor, an environmental offset based on the environmental data wherein the environmental offset is operable to adjust a reference phase offset; and dynamically adjusting the environmental offset in response to a detected change in the environmental data. In some embodiments of the method the environmental data comprises temperature data. In some embodiments of the method the environmental data comprises voltage data.

In some embodiments the method further includes receiving receiver cable length measurements for a plurality of receiver cables; determining a change in cable length based on the received environmental data; and calculating an environmental offset further based on the change in receiver cable length. In some embodiments the method further includes receiving reference values for environmental data; comparing the reference environmental data to the received environmental data; and calculating an environmental offset further based on the difference between the reference environmental data and the received environmental data.

In some embodiments an apparatus is provided including a processor and a memory including computer program code, the memory and computer program code configured to, with the processor, cause the apparatus to receive environmental data from a plurality of receivers; calculate an environmental offset based on the environmental data, wherein the environmental offset is operable to adjust a reference phase offset; and dynamically adjust the environmental offset in response to a detected change in the environmental data. In some embodiments of the apparatus the environmental data comprises temperature data. In some embodiments of the apparatus the environmental data comprises voltage data. In some embodiments of the apparatus the memory and computer program code are further configured to receive receiver cable length measurements for a plurality of receiver cables; determine a change in cable length based on the received environmental data; and calculating an environmental offset further based on the change in receiver cable length. In some embodiments of the apparatus the memory and computer program code are further configured to receive reference values for environmental data; compare the reference environmental data to the received environmental data; and calculating an environmental offset is further based on the difference between the reference environmental data and the received environmental data.

In some embodiments a computer program product is provided including a non-transitory computer readable medium having program code portions stored thereon, the program code portions configured, upon execution to receive environmental data from a plurality of receivers; calculate an environmental offset based on the environmental data, wherein the environmental offset is operable to adjust a reference phase offset; and dynamically adjust the environmental offset in response to a detected change in the environmental data. In some embodiments of the computer program product the environmental data comprises temperature data. In some embodiments of the computer program product the environmental data comprises voltage data.

In some embodiments of the computer program product the program code portions are further configured, upon execution, to receive receiver cable length measurements for a plurality of receiver cables; determine a change in cable length based on the received environmental data; and calculating an environmental offset is further based on the change in receiver cable length. In some embodiments of the computer program product the program code portions are further configured, upon execution, to receive reference values for environmental data; compare the reference environmental data to the received environmental data; and calculating an environmental offset is further based on the difference between the reference environmental data and the received environmental data.

In some embodiments a method is provided including determining a configuration occurrence, wherein the configuration occurrence is indicative of an action condition within a receiver hub configuration that is causing a degradation of accuracy of location data when compared to a predetermined accuracy threshold or a delay in location calculations when tag blink data volume meets a predetermined volume threshold; identifying, using a processor, the action condition within the receiver hub configuration by comparing one or more metrics to a set of performance thresholds; determining an adjustment to the receiver hub configuration; and adjusting the receiver hub configuration to address the configuration occurrence In some embodiments the method also includes receiving an indication of a remote connection to the receiver hub. In some embodiments of the method the action condition is excessive receiver hub output data. In some embodiments of the method the action condition is excessive tag data. In some embodiments of the method the action condition is insufficient tag data. In some embodiments of the method the action condition is an unstable reference.

In some embodiments the method also includes reprocessing tag blink data with the adjusted receiver hub configuration. In some embodiments of the method, determining an adjustment receiver hub configuration also includes classifying a plurality of receivers as interested and non-interested and adjusting the receiver hub configuration also includes adjusting a range of at least one receiver based on the receiver classification. In some embodiments of the method, adjusting the receiver hub configuration also includes reducing a range of at least one receiver. In some embodiments of the method adjusting the receiver hub configuration also includes increasing a range of at least one receiver. In some embodiments of the method adjusting the receiver hub configuration also includes terminating monitoring of the unstable reference. In some embodiments of the method adjusting the receiver hub configuration also includes terminating use of the unstable reference.

In some embodiments an apparatus is provided including a processor and a memory including computer program code, the memory and computer program code configured to, with the processor, cause the apparatus to determine a configuration occurrence, wherein the configuration occurrence is indicative of an action condition within a receiver hub configuration that is causing a degradation of accuracy of location data when compared to a predetermined accuracy threshold or a delay in location calculations when tag blink data volume meets a predetermined volume threshold; identify the action condition within the receiver hub configuration by comparing one or more metrics to a set of performance thresholds; determine an adjustment to the receiver hub configuration; and adjust the receiver hub configuration to address the configuration occurrence.

In some embodiments of the apparatus the memory and computer program code are further configured to, with the processor, cause the apparatus to receive an indication of a remote connection to the receiver hub. In some embodiments of the apparatus the action condition is excessive receiver hub output data. In some embodiments of the apparatus the action condition is excessive tag data. In some embodiments of the apparatus the action condition is insufficient tag data. In some embodiments of the apparatus the action condition is an unstable reference.

In some embodiments of the apparatus the memory and computer program code are further configured to, with the processor, cause the apparatus to reprocess tag blink data with the adjusted receiver hub configuration. In some embodiments of the apparatus determining an adjustment to the receiver hub configuration also includes classifying a plurality of receivers as interested and non-interested and adjusting the receiver hub configuration also includes adjusting a range of at least one receiver based on the receiver classification. In some embodiments of the apparatus adjusting the receiver hub configuration also includes reducing a range of at least one receiver.

In some embodiments of the apparatus adjusting the receiver hub configuration also includes increasing a range of at least one receiver. In some embodiments of the apparatus adjusting the receiver hub configuration also includes terminating monitoring of the unstable reference. In some embodiments of the apparatus some embodiments of the apparatus adjusting the receiver hub configuration also includes terminating use of the unstable reference.

In some embodiments a computer program product is provided including a non-transitory computer readable medium having program code portions stored thereon, the program code portions configured, upon execution to determine a configuration occurrence, wherein the configuration occurrence is indicative of an action condition within a receiver hub configuration that is causing a degradation of accuracy of location data when compared to a predetermined accuracy threshold or a delay in location calculations when tag blink data volume meets a predetermined volume threshold; identify the action condition within the receiver hub configuration by comparing one or more metrics to a set of performance thresholds; determine an adjustment to the receiver hub configuration; and adjust the receiver hub configuration to address the configuration occurrence.

In some embodiments of the computer program the program code portions are further configured, upon execution, to receive an indication of a remote connection to the receiver hub. In some embodiments of the computer program the action condition is excessive receiver hub output data. In some embodiments of the computer program product the action condition is excessive tag data. In some embodiments of the computer program product the action condition is insufficient tag data. In some embodiments of the computer program product the action condition is an unstable reference.

In some embodiments of the computer program product the program code portions are further configured, upon execution, to reprocess tag blink data with the adjusted receiver hub configuration. In some embodiments of the computer program product determining an adjustment to the receiver hub configuration also includes classifying a plurality of receivers as interested and non-interested and adjusting the receiver hub configuration also includes adjusting a range of at least one receiver based on the receiver classification.

In some embodiments of the computer program product adjusting the receiver hub configuration also includes reducing a range of at least one receiver. In some embodiments of the computer program product adjusting the receiver hub configuration also includes increasing a range of at least one receiver. In some embodiments of the computer program product adjusting the receiver hub configuration also includes terminating monitoring of the unstable reference. In some embodiments of the computer program product adjusting the receiver hub configuration also includes terminating use of the unstable reference.

In some embodiments a method is provided including determining a reference occurrence, the reference occurrence is indicative of a primary suspended reference phase offset table failure; accessing, in response to determining the reference occurance, blink data associated with one or more reference tags; and calculating, using a processor, a secondary reference phase offset between a plurality of receivers.

In some embodiments of the method the primary suspended reference phase offset table failure includes a loss of primary suspended reference phase offset table. In some embodiments of the method the primary suspended reference phase offset table failure comprises a loss of calibration of the primary suspended reference phase offset table. In some embodiments of the method generating a reference phase offset also includes receiving blink data from the one or more reference tags at a plurality of receivers; and the secondary reference phase offset is a difference between a reference clock time at receipt of the reference tag signal at a respective plurality of receivers.

In some embodiments the method also includes analyzing a plurality of secondary reference phase offset calculations for at least one reference tag receiver pair over a time interval; and generating a suspended reference phase offset table in an instance in which the plurality of secondary reference phase offset calculations for the at least one reference tag receiver pair satisfy a stability threshold, wherein a secondary suspended reference phase offset table is generated by causing the secondary reference phase offset to be stored in a memory for later tag location calculations. In some embodiments the method also includes receiving tag blink data; and calculating, using a processor, a tag location data, the calculating a tag location data is based on a time difference of arrival at plurality of receivers of the tag blink data by adding the secondary reference phase offset based on the one or more reference tags. In some embodiments the method also includes receiving tag blink data; and calculating, using a processor, a tag location data, the calculating a tag location data is based on a time difference of arrival at a plurality of receivers of the tag blink data by adding the secondary reference phase offset of the stored secondary suspended reference phase offset table.

In some embodiments an apparatus is provided including a processor and a memory including computer program code, the memory and computer program code configured to, with the processor, cause the apparatus to determine a reference occurrence, the reference occurrence is indicative of a primary suspended reference phase offset table failure; access, in response to determining the reference occurrence, blink data associated with one or more reference tags; and calculate a secondary reference phase offset between a plurality of receivers.

In some embodiments of the apparatus the primary suspended reference phase offset table failure comprises a loss of primary suspended reference phase offset table. In some embodiments of the apparatus the primary suspended reference phase offset table failure comprises a loss of calibration of the primary suspended reference phase offset table. In some embodiments of the apparatus generating a reference phase offset also includes receiving blink data from the one or more reference tags at a plurality of receivers; and the secondary reference phase offset is a difference between a reference clock time at receipt of the reference tag signal at a respective plurality of receivers.

In some embodiments of the apparatus the memory and computer program code are further configured to, with the processor, cause the apparatus to analyze a plurality of secondary reference phase offset calculations for at least one reference tag receiver pair over a time interval; and generate a suspended reference phase offset table in an instance in which the plurality of secondary reference phase offset calculations for the at least one reference tag receiver pair satisfy a stability threshold, wherein a secondary suspended reference phase offset table is generated by causing the secondary reference phase offset to be stored in a memory for later tag location calculations.

In some embodiments of the apparatus the memory and computer program code are further configured to, with the processor, cause the apparatus to receive tag blink data; and calculate, using a processor, a tag location data, the calculating a tag location data is based on a time difference of arrival at plurality of receivers of the tag blink data by adding the secondary reference phase offset based on the one or more reference tags. In some embodiments of the memory and computer program code are further configured to, with the processor, cause the apparatus to receive tag blink data; and calculate, using a processor, a tag location data, the calculating a tag location data is based on a time difference of arrival at a plurality of receivers of the tag blink data by adding the secondary reference phase offset of the stored secondary suspended reference phase offset table.

In some embodiments a computer program product is provided that includes a non-transitory computer readable medium having program code portions stored thereon, the program code portions configured, upon execution to determine a reference occurrence, the reference occurrence is indicative of a primary suspended reference phase offset table failure; access, in response to determining the reference occurance, blink data associated with one or more reference tags; and calculate a secondary reference phase offset between a plurality of receivers.

In some embodiments of the computer program product the primary suspended reference phase offset table failure comprises a loss of primary suspended reference phase offset table. In some embodiments of the computer program product the primary suspended reference phase offset table failure comprises a loss of calibration of the primary suspended reference phase offset table. In some embodiments of the computer program product generating a reference phase offset also includes receiving blink data from the one or more reference tags at a plurality of receivers; and the secondary reference phase offset is a difference between a reference clock time at receipt of the reference tag signal at a respective plurality of receivers.

In some embodiments of the computer program product the program code portions are further configured, upon execution, to analyze a plurality of secondary reference phase offset calculations for at least one reference tag receiver pair over a time interval; and generate a suspended reference phase offset table in an instance in which the plurality of secondary reference phase offset calculations for the at least one reference tag receiver pair satisfy a stability threshold, wherein a secondary suspended reference phase offset table is generated by causing the secondary reference phase offset to be stored in a memory for later tag location calculations. In some embodiments of the computer program the program code portions are further configured, upon execution, to receive tag blink data; and calculate, using a processor, a tag location data, the calculating a tag location data is based on a time difference of arrival at plurality of receivers of the tag blink data by adding the secondary reference phase offset based on the one or more reference tags. In some embodiments of the computer program product the program code portions are further configured, upon execution, to receive tag blink data; and calculate, using a processor, a tag location data, the calculating a tag location data is based on a time difference of arrival at plurality of receivers of the tag blink data by adding the secondary reference phase offset based on the one or more reference tags.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8 illustrates an exemplary reference phase offset table in accordance with some example embodiments of the present invention;

DETAILED DESCRIPTION

Figure 1:
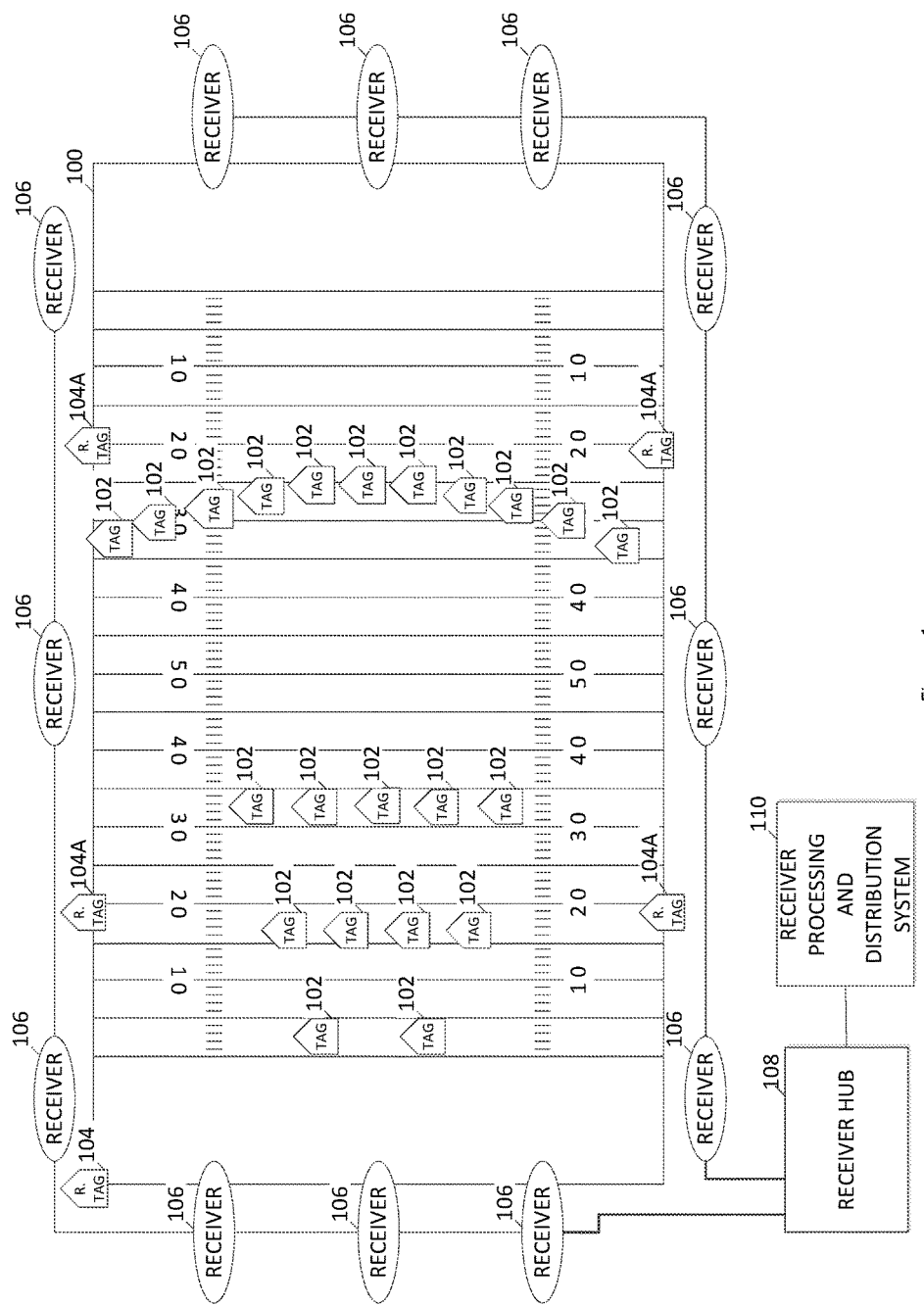
FIG. 1 illustrates an exemplary radio frequency locating system for determining the location of an object in accordance with some example embodiments of the present invention.

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Definitions

A reference phase offset as referred to herein is a time value pair between a particular pair of receivers and a reference tag blink data transmission. A reference phase offset is a measure of the relative phase between two internal receiver clocks. The tag position is known, and so propagation time can be determined and subtracted from the time measurements to determine the actual counter offsets (i.e., relative counts at any time). The reference phase offset indicates, in some examples, the differential time of arrival of a reference tag blink data transmission between two particular receivers. A reference phase offset may be recorded as the differential time in arrival between two receivers. or the differential time of arrival at a receiver and transmission time for a reference tag/receiver pair.

Reference, as used herein, may relate to the generation and/or use of one or more reference phase offset calculations or reference offset data. In an instance in which the reference is stored in a memory for subsequent use, such as in an example where reference is no longer being calculated, reference may be also referred to as being suspended herein. In some examples, suspended reference phase offset table data may describe the outcome of a reference phase offset calculation.

Overview

Location systems use a known reference location and signal to establish system referencing for location calculations. Reference location transmissions rely on line of sight with receivers and are susceptible to RF interference and physical blockage. Noisy environments, such as "game day" at a sporting event, may prevent the system from establishing or otherwise maintaining connection or otherwise receive a reference signal to establish reference during the event due to high instances of RF interference and/or physical blocking of a reference signal. These interferences may drastically reduce accuracy of the location calculations or temporarily disable the locating system.

As such systems, methods, apparatus, and computer program products of some embodiments of the present invention are configured to allow the locating system to suspend or otherwise store the reference in the form of one or more reference phase offsets for later tag location calculations, therefore eliminating or otherwise reducing RF and physical blockage interferences, in locating systems in which the phase relationship is locked. This may be accomplished, in some examples, by receiving the reference tag blink data; calculating a reference phase offset for each reference tag to receiver pair; and generating a suspended reference phase offset table, based on the reference phase offset, which is stored to memory. With these interferences removed, the location system may provide more reliable and accurate location monitoring as described herein.

Dynamically calculated or suspended reference phase offsets may suffer from inaccuracies due to RF or physical interference at the time of reference phase offset calculation. In some example embodiments, because the reference phase offset is suspended prior to the event, the suspended reference phase offset table may be generated during a period with minimal RF or physical interferences. This may be accomplished by automatic or manual determination of an optimal RF receiving period (e.g. low RF and/or physical interference) prior to calculation and suspension of the reference phase offset. Suspended reference phase offset table during optimal RF receiving conditions further improves accuracy over dynamically calculated or suspended reference offsets which are calculated during period with RF or physical interference.

Variations in receipt of reference tag blink data due to signal bounce or missed transmissions may reduce the accuracy of the reference phase offset calculation. A location system may determine a consistent reference phase timing prior to generating the suspended reference phase offset table (e.g., analyzing a plurality of reference phase offset calculations for at least one reference tag to receiver pair over a time interval). This may be accomplished by comparing successive reference phase offsets to a stability threshold (e.g., generating a suspended reference phase offset table in an instance in which the plurality of reference phase offset calculations for the at least one reference tag receiver pair satisfy a stability threshold). Once a series of reference phase offsets satisfies the stability threshold the location system may generate or otherwise lock in the suspended reference phase offset table. Suspended reference phase offset table of a reference phase offset(s) which have satisfied the stability threshold provides further accuracy over a suspended reference phase offset table of a single calculated reference phase offset.

Some locations systems utilize receiver cables which may change length proportional to changes in temperature or change signal travel time proportionally to receiver voltage. Event locations vary drastically in the stability of the environment, for example an indoor arena with air conditioning may have little variation. In contrast, an outdoor football stadium in Seattle, Wash. may have a change of twenty or more degrees from an evening suspended reference phase offset table to an afternoon game the following day. In dynamically calculated reference phase offsets changes in environmental data were compensated at each calculation. In an instance in which a suspended reference phase offset table is used, these environmental changes can affect the accuracy of the reference phase offset for each receiver and therefore the accuracy of the tag location calculations. A location system may compensate the suspended reference phase offset table for changes in environmental conditions, specifically temperature and/or voltage. This may be accomplished by storing the initial environmental conditions and/or receiver cable lengths with the suspended reference phase offset table. The location system may monitor the environmental conditions and calculate an environmental offset for the proportional change in cable length for a change in temperature or the proportional change in signal travel time for a change in receiver voltage. The environmental offset may be dynamically adjusted and applied (e.g. added) to the suspended reference phase offset table to compensate for a change in the environmental conditions.

In some examples the system may be configured to detect one or more configuration issues, problems or the like and compensate reference accordingly. In some examples, a location system may receive a volume of tag data based on the receiver hub configuration, specifically from a range in which the receiver is configured to receive tag data. The receipt of a volume of tag data that exceeds a volume threshold may cause delays in the calculation of tag locations, reduce accuracy of tag location calculations and/or reduce the processing availability of the receiver hub. Whereas, the receipt of a volume of tag data that fails to satisfy a minimum volume threshold may cause inaccuracies in the tag location data due to insufficient information to calculate a tag location or tag location calculations based on minimum tag data. Additionally or alternatively, a location system may have tag location inaccuracies due to an unstable reference (e.g., a reference that fails to satisfy, after comparing successive reference phase offsets, a stability threshold). The reference phase offset is used to calculate each tag location and variations in the reference will cause all tag locations calculated with the unstable reference to be less accurate.

In further example embodiments, a location system may monitor receiver hub performance metrics such as tag location accuracy, tag location calculation delay time, reference phase offset stability, and processing availability to determine a configuration occurrence and adjust the receiver hub configuration to resolve the configuration occurrence. A configuration occurrence may include a volume of tag data that exceeds a volume threshold (e.g. excessive tag data), a volume of tag data that fails to satisfy a minimum volume threshold (e.g. insufficient tag data), or an unstable reference. The location system identifies or otherwise determines a receiver hub action condition which satisfies a predetermined threshold, such as low tag location accuracy, low processing availability reference phase offset stability, and/or delay in tag location calculation.

In some example embodiments, the location system may determine an adjustment to the receiver hub configuration and adjust the receiver hub configuration. For example, if there is low tag location accuracy, low processor availability, and/or delay in tag location calculation the location system may identify excessive tag data condition and adjust the receiver hub configuration by reducing the range of specified receivers. In some examples, the location system may determine an adjustment based on low tag location accuracy without delay in tag location calculations or low processor availability identifying insufficient tag data or an unstable reference condition. An unstable reference may also be determined in an instance in which the successive reference phase offsets fail meet a stability threshold. In an instance in which the location system identifies an insufficient tag data condition, the location system may determine and adjust the receiver hub configuration by increasing the range of specified receivers. In an instance in which the location system identifies an unstable reference condition, the location system may terminate monitoring or otherwise cease to use the unstable reference in calculating tag locations.

The location system may continue to monitor receiver hub configuration to ensure the adjustment has resolved the configuration occurrence. In some examples, further adjustments may be made. The location system may additionally reprocess any tag data received during the configuration occurrence.

Locations systems with suspended reference may be susceptible to loss, corruption, or loss of calibration to the suspended reference resulting in inaccurate tag locations. The suspended reference phase offset table stored in memory may become damaged or inaccurate due to a loss of power, mechanical disturbance to a receiver, or corruption of the suspended reference phase offset table data.

In some example embodiments, the location system may determine a reference occurrence indicative of a primary suspended reference phase offset table failure. A loss of suspended reference phase offset table may be the complete loss of the suspended reference phase offset table data, partial loss of suspended reference phase offset table data, the corruption of the suspended reference phase offset table data, or loss of calibration of the suspended reference phase offset table. The location system may monitor various system parameters to determine a reference occurrence, such as, system power, receiver power, tag location accuracy, receiver alignment and/or stability, tag location calculation program errors, or the like.

In an instance in which the location system determines a reference occurrence, the location system accesses reference tags, in response to the determining a reference occurrence. The reference tags may be permanent, semi-permanent, or temporary positioned reference tags placed within or about the monitored area. The location system may receive reference tag blink data and dynamically calculate a secondary reference phase offset. The location system may continue with dynamic calculations of the secondary reference phase offset at a predetermined interval. Alternatively or additionally, the location system may generate a secondary reference phase suspension by storing the reference phase offset to a memory for later tag location calculation. The location system may receive tag blink data and may calculate tag locations using the dynamically calculated secondary reference phase offset and/or the secondary reference phase suspension. In an additional or alternate example embodiment, the location system may reprocess tag location data received during the reference occurrence with the secondary reference phase offset or suspended reference phase offset table.

By establishing a secondary reference phase offset and/or suspended reference phase offset table, the location system may continue real time calculation of tag location with maximum accuracy, in the event of a reference occurrence. Additionally the tag location data received during the reference occurrence may be accurately calculated at a later time or with minimal delay.

Example RF Locating System Architecture

FIG. 1 illustrates an exemplary locating system 100 useful for calculating a location by an accumulation of location data or time of arrivals (TOAs) at a receiver hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, is used to determine a phase offset between the counters associated with at least a subset of the of the receivers 106. The RTLS tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Receiver hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less that a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored area or zone, such as monitored area 100 illustrated herein as a football field. The reference tags 104 may be permanently or semi permanently mounted in locations with a clear line of sight (e.g. no RF obstructions) to the receivers 106. Alternatively or additionally, temporary reference tags 104A may be positioned within and/or about the monitored area or zone, and removed after generating a suspended reference phase offset table as described below. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Receiver hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a reference phase offset between any given pair of receivers in the receivers 106, the reference phase offset is readily determined through use of a reference tag 104/104A. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the Receiver hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the Receiver hub 108 (e.g., the data cables may enable a transfer speed of 2 Mbps). In some examples, measurement data is transferred to the Receiver hub at regular polling intervals.

As such, the Receiver hub 108 determines or otherwise computes tag location (i.e., object location) by processing TOA measurements relative to multiple data packets detected by the receivers 106. In some example embodiments, the Receiver hub 108 may be configured to resolve the coordinates of a tag using nonlinear optimization techniques.

In some examples, TOA measurements from multiple receivers 106 are processed by the Receiver hub 108 to determine a location of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated location coordinates ($x_0$, $y_0$, $z_0$) of the transmit tag 102 represents the measurement error for each respective TOA, and the minimization of the sum of the squares of the TOA measurement errors from each receiver participating in the DTOA location estimate provides for both the location coordinates ($x_0$, $y_0$, $z_0$) of the transmit tag and of that tag's transmit time $t_0$.

In some examples, the system described herein may be referred to as an "over-specified" or "over-determined" system. As such, the Receiver hub 108 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (1)$$

Where N is the number of receivers, c is the speed of light, $(x_j, y_j, z_j)$ are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error $\varepsilon$ in Equation 1 may be the Davidon-Fletcher-Powell (DFP) quasi-Newton algorithm, for example. In some examples, the optimization algorithm to minimize the error $\varepsilon$ in Equation 1 may be a steepest descent algorithm. In each case, the algorithms may be seeded with an initial location estimate (x, y, z) that represents the two-dimensional (2D) or three-dimensional (3D) mean of the positions of the receivers 106 that participate in the tag location determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j: j=1, \ldots, N\}$ are positioned at known coordinates $(x_{R_j}, y_{R_j}, z_{R_j})$, which are respectively positioned at distances $d_{R_j}$ from a reference tag 104, such as given in Equation 2:

$$d_{R_j} = \sqrt{(x_{R_j}-x_T)^2 + (y_{R_j}-y_T)^2 + (z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, $\beta$ in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta\tau_R + O_j + \beta d_{R_j}/c \quad (3)$$

Where c is the speed of light and $\beta$ is the number of fine resolution count increments per unit time (e.g., one per nanosecond). Similarly, each object tag $T_i$ of each object to be located transmits a signal at an unknown time $\tau_i$ to produce a count $N_{i_j}$, as given in Equation 4:

$$N_{i_j} = \beta\tau_i + O_j + \beta d_{i_j}/c \quad (4)$$

at receiver $R_j$ where $d_{i_j}$ is the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104/104A information, reference phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{Rj}$-$d_{Rk}$ remains constant, (which means the receivers and reference tag are fixed and there is no multipath situation) and $\beta$ is the same for each receiver. Note that $\Delta_{jk}$ is a known quantity, since $N_{R_j}$, $N_{R_k}$, $\beta$, $d_{R_j}/c$, and $d_{R_k}/c$ are known. That is, the reference phase offsets between receivers $R_j$ and $R_k$ may be readily determined based on the reference tag 104/104a transmissions. The reference phase offsets are stored in a reference phase offset table, depicted in FIG. 8. The reference phase offsets, of the reference phase offset table, are updated at each receipt of a reference tag 104/104A. The location system may use the reference phase offsets from the reference phase offset table in the calculation of the object tag 102 location. Thus, again from the above equations, for a tag 102 ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

In some example embodiments, the location of a tag 102 may then be output to a receiver processing and distribution system 110 for further processing of the location data to advantageously provide visualizations, predictive analytics, statistics and/or the like.

As described above, a reference phase offset may be dynamically calculated each time the reference tag blink data is received. Tag locations may be calculated using the current reference phase offset in each instance in which tag blink data is received. Alternatively or additionally, a suspended reference phase offset table may be generated. A suspended reference phase offset table is a reference phase offset which may be stored to a memory for use by the receiver hub in later tag location calculations. The suspended reference phase offset table may include the TDOA for each reference tag blink amongst a plurality of receivers, corrected for propagation time, as described above. The generation and use of a suspended reference phase offset table for tag location calculations minimizes or otherwise removes various interferences and reference variations, therefore causing, in some example, more accurate and consistent tag locations.

In an example embodiment, a suspended reference phase offset table may be generated after comparing successive reference phase offsets to a stability threshold. Missed reference tags blinks may be reference tag blink data that is not received within a predetermined period, for example 1/10 of a second, 1 second, 2 seconds, or any other time value. Consistency may be determined in various manners including without limitation, manual comparison of tag physical location and calculated tag location, plotting tag location calculations and determining a location radius, or the time of arrival error for a location calculations, or the like. In some examples, consistency may be determined if a set of offset calculations for each receiver pair are within 5 ns of each other. By way of further example, the stability threshold may require no missed reference tag blinks detected for 5 successive phase offsets and a consistency of 80 percent. In another example, the stability threshold may allow 3 missed reference tag blinks, but require a consistency of 90 percent.

When the series of reference phase offsets satisfies the stability threshold, a suspended reference phase offset table may be generated. The suspended reference phase offset table may be generated by locking the reference phase offset values in the reference phase offset table, shown in FIG. 8. The suspended reference phase offset table, i.e. the values locked in the reference phase offset table, may be stored in a memory and used for subsequent location calculations. The reference phase offset of the suspended reference phase offset table may be set as the last, an average, or any other reference phase offset that satisfied the stability threshold. In an instance in which a suspended reference phase offset table has been generated, the subsequent event tag location calculations may use the stored reference phase offset of the suspended reference phase offset table. In some example embodiments, the suspended reference phase offset table may be generated during a period of low RF and/or physical interference. The determination of a RF signal receiving period with low RF and/or physical interferences may be determined manually or automatically (e.g. without user interaction). In an instance in which the determination is manual, a RF receiving period may be selected based on the level of use of the event area at certain times, such as the day prior to the event where low usage is expected. Further, reference tag blink data strength and quality may be monitored, such as received signal strength index (RSSI). When interferences are determined to be low, the suspended reference phase offset table generation may be initiated, suspended reference phase offset table In an instance in which the determination is automatic, various reference tag blink data metrics, such as, RSSI, or the like may be monitored and compared to an interference threshold. Additionally, other transmissions may be monitored, such as remote camera transmissions which may saturate the reference tag blink data. When the interference threshold is satisfied a suspended reference phase offset table may be generated as described above.

In some embodiments, a secondary reference phase offset may be calculated when a reference occurrence is determined that is indicative of a primary suspended reference phase offset table failure. A primary suspended reference phase offset table failure may include without limitation the complete loss of the suspended reference phase offset table data, the loss of a portion of the suspended reference phase offset table data, corruption of the suspended reference phase offset table data, loss of calibration of the suspended reference phase offset table, or the like. The receiver hub 108 and/or the receiver processing and distribution system 110 may monitor various system parameters to determine a reference occurrence, such as, system power, receiver 106 power, tag location calculation accuracy, receiver alignment and/or stability, tag location calculation program errors, or the like.

The receiver hub 108 and/or the receiver processing and distribution system may monitor for low tag location accuracy in a portion of the monitored area 100 or the entire monitored area indicative of a loss of calibration of a portion of the entire primary suspended reference phase offset table. A reference occurrence may be determined in an instance in which the tag location accuracy meets a predetermined threshold. For example, 70 percent accuracy for the entire monitored area, or 80 percent accuracy for a specified zonesuspended reference phase offset table A loss of system or receiver 106 power may cause a of change the reference clock timing differences, causing the reference phase offsets stored within the primary suspended reference phase offset table to be inaccurate. As such, a reference occurrence may be determined based on a loss of power to the system or one or more receivers. Alternatively, the loss of power to the system or one or more receivers may be a factor adjusting other threshold determinations. For example, an 80 percent accuracy for the entire monitored area or 90 percent for a zone may satisfy the tag location accuracy threshold in an instance in which a loss of power had been detected.

The receiver hub 108 and/or the receiver processing and distribution system may monitor the tag calculation program for errors, such as suspended reference phase offset table not found, suspended reference phase offset table corrupt, or other indicators of a loss or corruption of the primary suspended reference phase offset table. If a tag calculation program error indicative of the loss or corruption of the primary suspended reference phase offset table is received a reference occurrence may be determined.

The receivers may be equipped with stability or alignment circuitry to indicate an instance in which the receiver may have been moved after generating the primary suspended reference phase offset table. Alignment and/or stability circuitry may include, without limitation, tremblers to detect an impact to the receiver, liquid, bearing, or other level switches to indicate a change in level of the receiver, or a pressure switch to indicate a movement of the receiver. If movement of a receiver 106 is detected a reference occurrence may be determined or used as a factor adjusting other threshold determinations similar to a loss of system or receiver power.

In an instance in which a reference occurrence has been determined, reference tags 104/104A are accessed. Reference tags 104/104A may transmit blink data throughout the monitored event regardless of whether the blink data is received or utilized. Reference tag blink data may be received and ignored (e.g. not selected), not monitored, or used for a dynamic reference phase crosscheck during normal operations. If not selected or monitored at the time of the reference occurrence, the reference tags 104/104A are selected and/or monitored by the receiver hub 108. In an alternative embodiment in which the reference tags 104/104A are not transmitting at the time of the reference occurrence, an activation signal may be transmitted by a transmitter or transceiver to initiate the reference tag blink data transmissions.

A secondary reference phase offset may be calculated as described above with respect to calculating reference phase offset, based on the reference tag blink data. Tag 102 location may be calculated dynamically when tag blink data is received, by using the dynamically calculated secondary reference phase offset.

In an additional or alternative embodiment, a secondary suspended reference phase offset table may be generated based on the secondary reference phase offset as discussed above. The secondary suspended reference phase offset table may be used to calculate tag 102 locations based on received tag blink data.

The tag blink data received during the reference occurrence may be reprocessed with the secondary suspended reference phase offset table. The tag blink data may be stored in a memory and reprocessed at a later time or reprocessed on the establishment of a secondary reference phase offset or suspended reference phase offset table.

In some example embodiments, the suspended reference phase offset table is compensated for changes in the environment from the time of the suspended reference phase offset table generation to the calculation of tag locations. The time of arrival of various signals may depend on the length and/or voltage of receiver cables which may change due to changes in environmental conditions, such as temperature. In examples in which the reference phase offset is dynamically calculated, the cable length and voltage is inherent to the offsets which are calculated contemporaneously with the tag location calculations (e.g., the reference blink and tag blink may both have the same lag due to receiver cables and may be canceled out). In embodiments in which the reference is suspended, the changes in voltage and or cable length may be compensated by calculating the change in signal timing for each receiver based on the change in cable length or voltage.

The initial (e.g. reference) temperature, voltage, and cable length for each receiver are stored with the suspended reference phase offset table. The current environmental data (e.g. temperature and voltage) may be monitored and compared to the reference environmental data. An environmental offset may be calculated continuously for the current environmental conditions, or may be calculated when an environmental condition satisfies a predetermined threshold difference from the reference environmental data. For example, the predetermined threshold may be satisfied at 5 degrees change in temperature or 10 millivolt change in voltage. The environmental offset may be calculated by finding the proportional change in reference phase offset (e.g. reference tag blink data signal time) based on the change in receiver voltage or the change in cable length based on change in temperature as discussed in FIG. 5. The calculated environmental offset may be dynamically adjusted and added to the reference phase offset for each receiver in the suspended reference phase offset table.

In some example embodiments, one or more configuration settings may be adjusted based on the determination of a configuration occurrence indicative of an action condition within the receiver hub 108 configuration. The determination of a configuration occurrence may be based on one or more performance metrics (e.g. tag location accuracy, tag location calculation delay time, processing availability, or the like). The action conditions may include without limitation, excessive tag data (e.g. excessive tag location data output, excessive tag blink data input), insufficient tag data, unstable reference, or the like.

The action condition may be identified by comparing various performance metrics to predetermined thresholds and/or combinations of thresholds. For example insufficient tag data may be determined in an instance in which the tag location accuracy satisfies the predetermined tag accuracy threshold, but the tag location calculation delay and processing availability may not satisfy respective predetermined thresholds. In an example in which an excessive tag data is determined, tag location calculation delay, and/or processing availability satisfy a predetermined threshold, and the tag location accuracy may or may not satisfy a predetermined threshold. In an example embodiment in which an unstable reference is determined, tag location accuracy may satisfy the predetermined tag accuracy threshold, but the tag location calculation delay and processing availability may not satisfy respective predetermined thresholds. An unstable reference may also be determined in an instance in which the reference phase offset or series of reference phase offsets fails to meet a predetermined stability threshold when compared to previous reference phase offsets. In some examples, an area of interest may be selected. An area of interest may be any portion of the monitored area and may be selected manually or automatically as discussed in FIG. 6. In instances in which excessive or insufficient tag data is determined or an area of interest is selected the receivers may be classified as interested or non-interested. Interested receivers may be receivers which are in greater proximity to the tags 102 or area which are desired to be monitored, such as participants in the event. Non-interested tags may not be in proximity to the tags which are desired to be monitored or may have an overpopulation of tags 102 that are not currently relevant, such as participants on the sideline or dugout during a football or baseball game.

An adjustment to the receiver hub configuration may be determined based on the identified action condition. The adjustments to the receiver hub configuration may include without limitation, reducing receiver range, increasing receiver range, and termination of monitoring and/or use an unstable reference in tag location calculations. For example and in an instance in which excessive tag data is determined, the receiver hub configuration may be adjusted by reducing the range of a single receiver 106, all receivers, receivers zones, or receivers classified as non-interested. In an example embodiment in which insufficient tag data has been identified the receiver hub configuration may be adjusted by increasing the range of a single receiver 106, all receivers, receiver zones, or receivers classified as interested. In an example embodiment in which an unstable reference has been identified during a dynamic calculation of reference phase offset the receiver hub configuration may be adjusted by terminating the monitoring of the unstable reference. In an example embodiment in which an unstable reference has been identified and tag locations are utilizing a suspended reference phase offset table, the receiver hub configuration may be adjusted by terminating use of the unstable (or corrupt) reference in the tag location calculation.

The receiver hub 108 or the receiver processing and distribution system 110 may continue to monitor the performance metrics and determine if the configuration occurrence has been resolved or if additional adjustments are required.

In an instance in which an unstable reference was determined and an adjustment made to the receiver hub 108, the tag blink data which was collected during the configuration occurrence may be reprocessed. The receiver hub 108 or receiver processing and distribution system 110 may reprocess the tag blink data collected during the configuration occurrence without the unstable reference.

The exemplary radio frequency locating system of FIG. 1 may be used in providing performance analytics in accordance with some embodiments of the present invention. In the environment of FIG. 1, data may be captured and analyzed, such as during a sporting event to identify events, statistics, and other data useful to a sports team, league, viewer, licensee, or the like. In some embodiments, data associated with a number of objects or participants (e.g., players, officials, balls, game equipment, etc.) on a playing field, such as monitored area 100, may be generated and provided to a performance analytics system. As such, each object may have one or more attached tags 102 (such as to equipment worn by a player) to be used to track data such as location, change of location, speed, or the like of each object. In some embodiments, additional sensors, such as, without limitation, accelerometers, magnetometers, time-of-flight sensors, health sensors, temperature sensors, moisture sensors, light sensors, or the like, may be attached to each object to provide further data to the performance analytics system. Such additional sensors may provide data to the tag 102, either through a wired or wireless connection, to be transmitted to the receivers 106 or the sensors may be configured to transmit data to receivers (i.e., sensor receivers) separately from tags 102.

One or more of the receivers 106 may receive transmissions from tags 102 and transmit the blink data to a receiver hub 108. The receiver hub 108 may process the received data to determine tag location for the tags 102. The receiver hub 108 may transmit the tag location data to one or more processors, such as receiver processing and distribution system 110. Receiver processing and distribution system 110 may use one or more modules (e.g., processing engines) and one or more databases to identify the object each of the tags 102 is associated with, such as a player, official, ball, or the like.

In some embodiments, multiple tags 102 (as well as other sensors) may be attached to the equipment worn by an individual player, official, or other participant. The receiver processing and distribution system 110 may use one or more databases to associate the tag identifier (e.g., a tag UID) of each tag 102 with each player, official, object, or other participant and correlate the tag location data and/or other tag and sensor derived data for multiple tags 102 that are associated with a particular player, official, object, or other participant.

As discussed in greater detail below, the receiver processing and distribution system 110 may then use the tag location data and/or other tag, sensor derived data to determine player and play dynamics, such as a player's location, how the location is changing with time, orientation, velocity, acceleration, deceleration, total yardage, or the like. The receiver processing and distribution system 110 may also use the tag location data and/or other tag and sensor derived data to determine dynamics for other participants such as the officials, the ball, penalty markers, line of scrimmage or yards to gain markers, or the like, for use in generating data for performance analytics. The receiver processing and distribution system 110 may also use the data and one or more databases to determine team formations, play activity, events, statistics, or the like, such as by comparing the data to various models to determine the most likely formation or play or the events that have occurred during a game. The receiver processing and distribution system 110 may also use the data to provide statistics or other output data for the players, teams, and the game.

As will be apparent to one of ordinary skill in the art, the inventive concepts herein described are not limited to use with the UWB based RF locating system shown in FIG. 1. Rather, in various embodiments, the inventive concepts herein described may be applied to various other locating systems especially those that are configured to provide robust location resolution (i.e., subfoot location resolution).

Example Processing Apparatus

Figure 2:
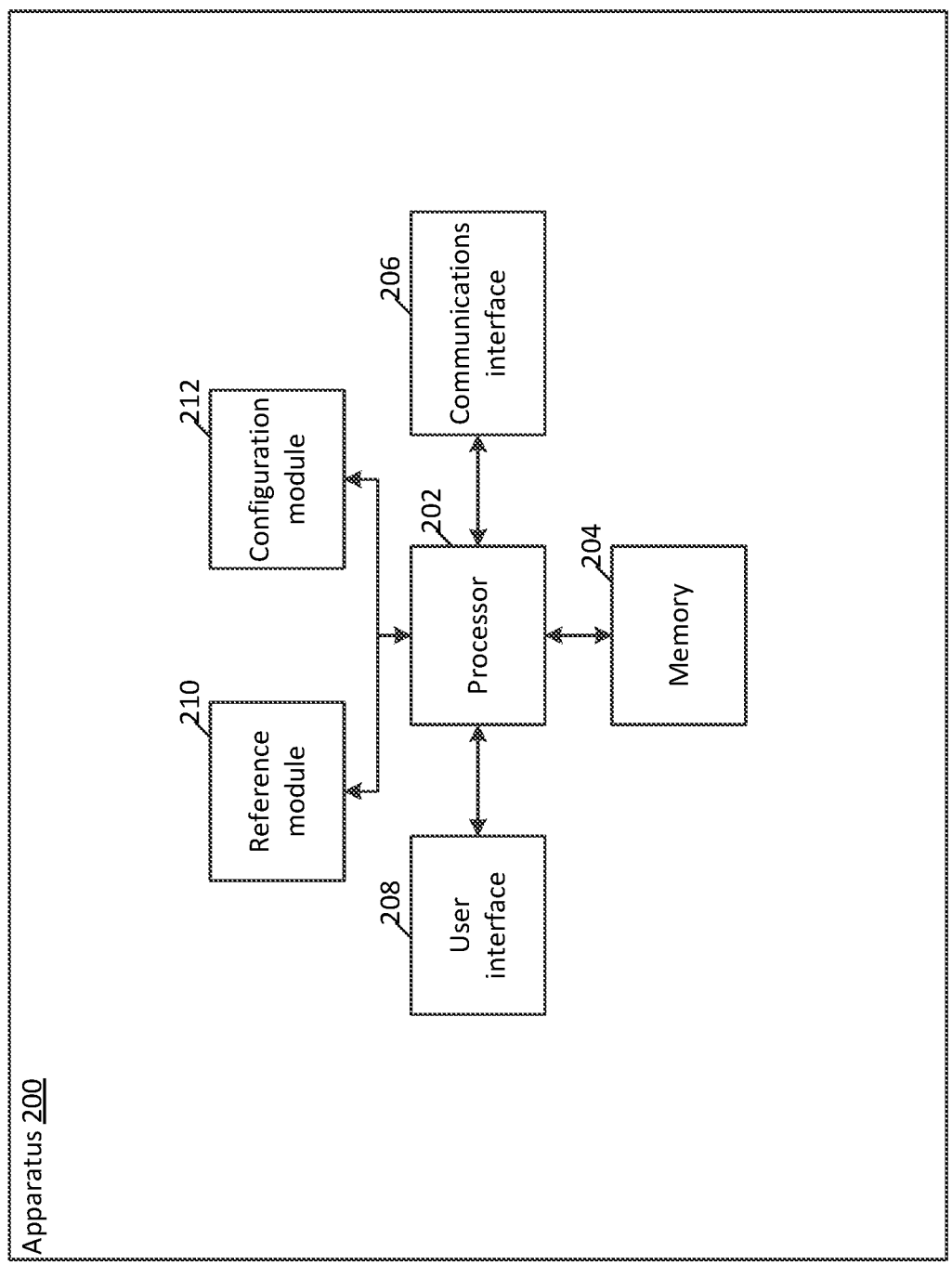
FIG. 2 shows a block diagram of components that may be included in a apparatus that may establish or maintain a reference phase offset; or adjust receiver hub configuration in accordance with example embodiments of the present invention discussed herein.

FIG. 2 shows a block diagram of components that may be included in an apparatus 200, such as receiver hub 108 or receiver processing and distribution system 110, that may establish and/or otherwise maintain a reference phase offset; or adjust receiver hub configuration in accordance with embodiments discussed herein. Apparatus 200 may comprise one or more processors, such as processor 202, one or more memories, such as memory 204, communication circuitry 206, user interface 208, reference module 210, and a configuration module 212. Processor 202 can be, for example, a microprocessor that is configured to execute software instructions and/or other types of code portions for carrying out defined steps, some of which are discussed herein. Processor 202 may communicate internally using data bus, for example, which may be used to convey data, including program instructions, between processor 202 and memory 204.

Memory 204 may include one or more non-transitory storage media such as, for example, volatile and/or non-volatile memory that may be either fixed or removable. Memory 204 may be configured to store information, data, applications, instructions or the like for enabling apparatus 200 to carry out various functions in accordance with example embodiments of the present invention. For example, the memory 204 could be configured to buffer input data for processing by processor 202. Additionally or alternatively, the memory 204 could be configured to store instructions for execution by processor 202. Memory 204 can be considered primary memory and be included in, for example, RAM or other forms of volatile storage which retain its contents only during operation, and/or memory 204 may be included in non-volatile storage, such as ROM, EPROM, EEPROM, FLASH, or other types of storage that retain the memory contents independent of the power state of the apparatus 200. Memory 204 could also be included in a secondary storage device, such as external disk storage, that stores large amounts of data. In some embodiments, the disk storage may communicate with processor 202 using an input/output component via a data bus or other routing component. The secondary memory may include a hard disk, compact disk, DVD, memory card, or any other type of mass storage type known to those skilled in the art.

In some embodiments, processor 202 may be configured to communicate with external communication networks and devices using communications circuitry 206, and may use a variety of interfaces such as data communication oriented protocols, including X.25, ISDN, DSL, among others. Communications circuitry 206 may also incorporate a modem for interfacing and communicating with a standard telephone line, an Ethernet interface, cable system, and/or any other type of communications system. Additionally, processor 202 may communicate via a wireless interface that is operatively connected to communications circuitry 206 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1×EV-DO, GPRS, W-CDMA, LTE, and/or any other protocol.

The apparatus 200 may include a user interface 208 that may, in turn, be in communication with the processor 202 to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The apparatus 200 may include a reference module 210 that may, in turn, be in communication with the processor 202 and configured to cause the processor to generate a suspended reference phase offset table. The reference module may cause the processor 202 to, receive reference tag blink data from the receivers (e.g. receivers 106 as shown in FIG. 1), calculate a reference phase offset, and generate a suspended reference phase offset table. The reference module 210 may also cause the processor 202 to determine an RF signal receiving period with low RF and/or physical interference, determine a reference phase timing satisfies a stability threshold, receive tag blink data from the receivers 106, and calculate a tag location. The reference module 210 may additionally cause the processor 202 to receive environmental data from the receivers 106, compare received environmental data to the reference environmental data, calculate an environmental offset, and apply the environmental offset to the reference phase offset of the suspended reference phase offset table.

In some embodiments the reference module 210 may additionally be configured to determine a reference occurrence, access reference tags, and calculate a secondary reference offset. The reference module 210 may also cause the processor 202 receive reference tag blink data, generate a secondary suspended reference phase offset table based on the secondary reference phase offsets, receive tag blink data from the receivers 106, calculate tag location, and reprocess tag blink data with the secondary suspended reference phase offset table.

The apparatus 200 may include a configuration module 212 that may, in turn, be in communication with the processor 202 and configured to cause the processor to adjust a receiver hub (e.g. receiver hub 108 as shown in FIG. 1) configuration. The configuration module 212 may cause the processor 202 to determine a configuration occurrence, identify a receiver hub action condition which satisfies a predetermined threshold, determine a receiver hub configuration adjustment, and adjust the receiver hub configuration. The configuration module 212 may also be configured to cause the processor 202 receive an indication of a remote connection to the receiver hub 108, classify receivers as interested or non-interested, and reprocess tag blink data with an optimal configuration.

FIGS. 3, 5, 7, and 9 illustrate example flowcharts of the operations performed by an apparatus, such as computing system 200 of FIG. 2, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present invention and executed by a processor 202 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3, 5, 7, and 9, when executed, convert a computer or processing circuitry into a particular machine configured to perform an example embodiment of the present invention. Accordingly, the operations of FIGS. 3, 5, 7, and 9 define an algorithm for configuring a computer or processor, to perform an example embodiment. In some cases, a general purpose computer may be provided with an instance of the processor which performs the algorithm of FIGS. 3, 5, 7, and 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIGS. 3, 5, 7, and 9). It should be appreciated that each of the modifications, optional additions or amplifications described herein may be included with the operations herein either alone or in combination with any others among the features described herein.

Example Process for Generating a Reference Suspension

Figure 3:
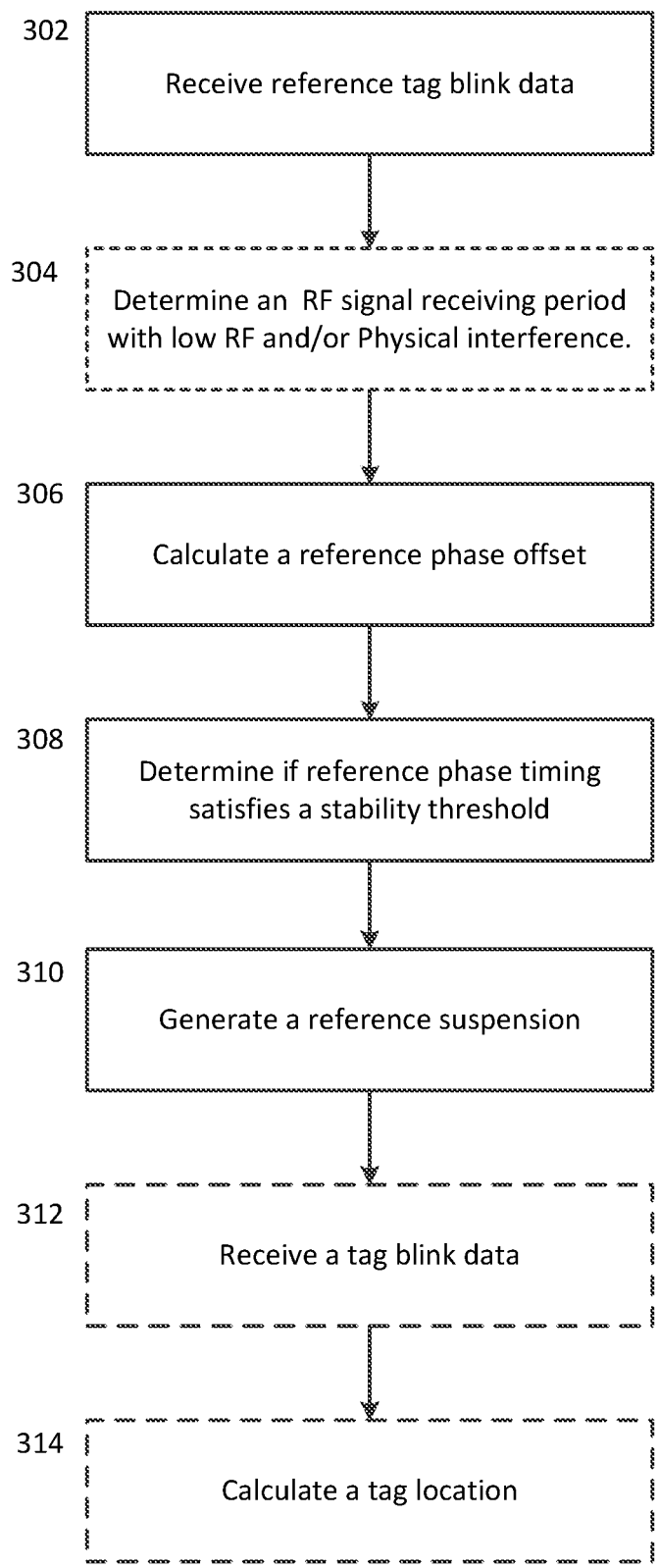
FIG. 3 illustrates a flowchart of an exemplary process for generating a suspended reference phase offset table in accordance with some example embodiments of the present invention.

FIG. 3 illustrates a flowchart of an exemplary process for generating a suspended reference phase offset table in accordance with some embodiments of the present invention. At 302, an apparatus may include means such as a communications interface 206, a processor 202, reference module 210, or the like configured for receiving reference tag blink data from receivers 106. The reference tag blink data may be sent from permanent, semi-permanent, or temporary reference tags 104A placed within the monitored area prior to generating a suspended reference phase offset table or semi-permanent reference tags 104 which are maintained in respective positions with exception of maintenance. As described in FIG. 1 the reference tag blink data may be a burst transmission, a pulse, or a pulse pair. The reference tag blink data may include a tag unique identification number (tag UID), other identification information, a sequential burst count, stored tag data, or other desired information.

The reference module 210 may cause the processor 202 to time stamp the reference tag blink data with a reference clock time at receipt of the reference tag blink data. In some embodiments, each receiver 106 may time stamp the reference tag 104 blink data with a reference clock time at receipt of the reference tag blink data.

At 304, an RF signal receiving period with low RF and/or physical interference is determined. The reference module 210 may be configured to cause a processor 202 to monitor and compare reference tag signal strength and quality metrics to predetermined thresholds. For example, the processor may compare reference tag RSSI to predetermined thresholds.

Additionally the processor 202 may monitor for transmissions that may saturate or block the reference tag blink data. For example, remote camera transmissions to a base transceiver at the event site or other interfering signals that may pass through the event site.

In an additional example embodiment the determination of a RF signal receiving period may be manually supplemented. The determination may be initiated by a user during periods in which lower RF and physical interference is expected. For example, the day or several hours prior to an event, or the like. During such periods there is substantially less personnel within the monitored area, less personnel or equipment movement which may block the line of sight reference blink data transmissions from reference tags to receivers. Further, there are fewer transmissions from event service providers causing RF interference.

In some example embodiments, the determination of an RF signal receiving period may be performed manually. In an instance in which the determination of an RF signal receiving period is manual, a user may verify the reference tag signal strength and quality metrics and initiate the calculation of reference phase offset as described below.

At 306, the reference module 210 may be configured to cause the processor 202 to calculate a reference phase offset. A reference phase offset may be the difference in time of arrival of reference tag 104/104A blink data at each pair of receivers. The processor 202 may compile the reference tag blink data and calculate differential time of arrival as reference tag to receiver pairs in a reference phase offset table depicted in FIG. 8 and discussed in FIG. 1. For example the reference phase offset may be the TDOA of a reference tag blink data transmission at respective receiver pairs. For example, in an embodiment with 4 receivers the reference phase offset table may have TDOA offsets for the following receiver pairs: 1-2, 1-3, 1-4, 2-3, 2-4, and 3-4.

In some embodiments the reference phase offset may further include reference environmental data and receiver cable lengths. Reference environmental data may include the temperature data (e.g. ambient temperature), voltage, or the like for each receiver. The receiver cable lengths may include each individual timing cable associated with a receiver 106, a total cable length, daisy chain series cable length, or the like. Environmental data and cable length are discussed in further detail in FIGS. 4 and 5.

At 308, a reference phase timing which satisfies a stability threshold is determined. The reference module 210 may be configured to cause the processor 202 to compare a series of reference phase offsets to a predetermined stability threshold. The processor 202 may collect reference tag 104/104A blink data and calculate reference phase offsets for each reference tag blink data received for a predetermined period. For example, the processor 202 may collect reference tags 104/104A signals and calculate reference phase offsets for 10 seconds, 20, seconds, 30 seconds, 60 seconds, 120 seconds, or any other time value.

The reference module 210 may cause the processor 202 to analyze and compare reference phase offsets for missed reference tag blink data and consistency between each sequential reference phase offset. Missed reference tags blinks may be reference tag blink data that is not received within a predetermined period, for example $\frac{1}{10}$ of a second, 1 second, 2 seconds, or any other time value. Consistency may be percentage of reference phase offset reference tag receiver pairs values which match or percent deviation from an average value. For example, the processor may verify that all reference tag 104/104A blink data has been received for the current reference phase offset and then compare with the last reference phase offset or series of reference phase offsets to determine accuracy.

The reference module 210 may cause the processor 202 determine if reference phase timing satisfies the predetermined threshold in an instance in which a series of reference phase offsets has no missed reference tag blink data from reference tags 104/104A and the consistency of the reference phase offset series meets a predetermined threshold. For example, the series of reference phase offsets may be calculated in predetermined intervals (e.g. 5 seconds). Each of the reference phase offsets may then be compared to each other, such that a percentage of reference phase offsets which match, or percent deviation from an average which may be subtracted from 100 percent, is determined. For example, having a 5 second interval of reference phase offsets using a 1 Hz reference tag signal, all reference tag 104/104A blink data has been received and there is an 80 percent agreement, e.g. consistency between reference phase pairs, the processor 202 may determine a reference phase timing has satisfied the predetermined threshold and thus reference may be suspended. A suspended reference phase offset table may be the locking of the reference phase values, in the reference phase offset table, for use in subsequent location calculations.

In other examples the reference module 210 may cause the processor 202 to allow missed reference tag 104/104A blink data in an instance in which the reference phase offsets satisfy a higher predetermined consistency threshold. For example, the processor 202 may determine a reference phase timing has satisfied the predetermined threshold with 2 instances of missed reference tag blink data where the consistency of the reference phase offsets is 90 percent.

At 310, a suspended reference phase offset table is generated. The reference module 210 may be configured to cause the processor 202 to generate a suspended reference phase offset table. The processor 202 may cause a reference phase offset table to be stored in a memory (memory 204 as shown in FIG. 2) as a suspended reference phase offset table which may be used for tag (tag 102 as shown in FIG. 1) location calculations. For example, the processor 202 may select the last, an average, or any other of the reference phase offset of the determined reference phase timing at 308, and cause the reference phase offset to be stored in memory 204. During subsequent tag 102 location calculations the processor may use the reference phase offset of the suspended reference phase offset table.

At 312, tag blink data is received. The reference module 210 may be configured to cause the processor 202 to receive tag blink data from the communications interface 206, which in turn receives the tag blink data from receivers 106. At 314, tag location data is calculated. The processor 202 may be configured to calculate tag location, using the reference phase offset of the suspended reference phase offset table, as discussed in FIG. 1. In an alternative or additional embodiment, the processor 202 may use the dynamic reference phase offset calculated at 306 as discussed in FIG. 1 in calculating tag location data.

Example RF Locating System Calibrated to Adapt to Environmental Changes

Figure 4:
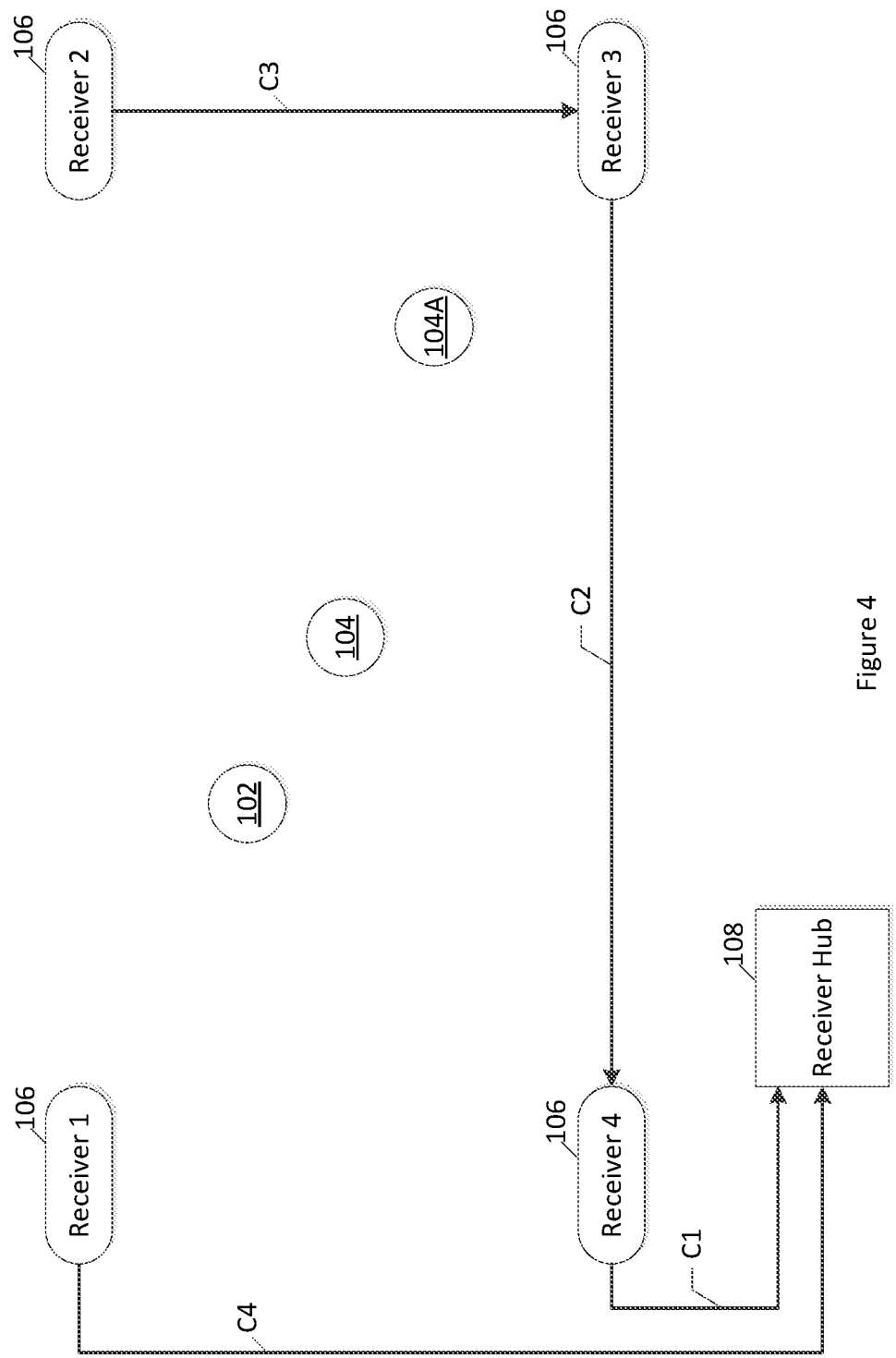
FIG. 4 illustrates an exemplary radio frequency locating system which may be calibrated to adapt for environmental changes in accordance with some example embodiments of the present invention.

FIG. 4 illustrates an exemplary radio frequency locating system which may be calibrated to adapt for environmental changes in accordance with some example embodiments of the present invention. In environments in which the environment is relatively stable (e.g. temperature is stable within 2 degrees, 5 degrees, 10 degrees, or any other temperature value), such as an indoor arena with sufficient air conditioning, the receiver hub 108 may generate a suspended reference phase offset table as described in FIG. 3 and not adjust for minor environmental condition changes. In an instance in which the environment may not have stable environmental conditions, such as outdoors or arena with insufficient air conditioning, where the temperature of the monitored area may vary widely, the suspended reference phase offset table may be adjusted for changes in receiver cable length and/or voltage due to changes in environmental condition. Environmental changes may affect receiver cable length C1-C4 and/or voltage and therefore time difference of arrival of reference tag 104 blink data or tag 102 blink data.

Each receiver cable length C1-C4 may be measured and an initial length entered into the reference phase offset table as the total length of all receiver cables, the length of each individual receiver cable, the length of receiver cable in a particular receiver daisy chain. For example a total receiver cable length may be $C1+C2+C3+C4=Cto$, an individual cable length may be $C1o$, $C2o$, $C3o$, or $C4o$, and a receiver daisy chain series may be $C1=Ct1o$, and $C2+C3+C4=Ct2o$.

In an alternative or additional embodiment the receiver cable length may be determined automatically by time domain reflection or other electronic measurement.

The initial environmental conditions or reference environmental data may be collected contemporaneously and entered into the reference phase offset table of the suspended reference phase offset table as described in FIG. 3 as a reference environmental data. Environmental data may include temperature values (To), voltage values (Vo), or the like as measured at the receivers 106.

The receiver hub 108 may monitor the environmental data (e.g. temperature and voltage values) sent by the receivers continuously or near continuously. The received environmental data may be compared to the reference environmental data. In an instance in which the difference between the reference and received environmental data satisfies a predetermined threshold, the receiver hub 108 may calculate an environmental offset. In an instance in with the environmental data is temperature the receiver hub may adjust for the change in receiver cable length C1-C4 due to changes in the temperature. For example, if the differential temperature threshold were set to 5 degrees a new environmental offset would be calculated where the reference temperature was 75 degrees and the received temperature is 81 degrees.

$|To-Ti|=\Delta T$ If $\Delta T>5$ calculate new environmental offset.

The receiver hub 108 may calculate the new environmental offset by determining a change in receiver cable length ($\Delta Cx$) and change to the reference phase offset, e.g. change in time difference of arrival due to longer or shorter cable length, for the particular receiver's receiver/reference tag pairs ($\Delta Rpo$) based on the change in environmental condition (temperature $\Delta T$). The change in environmental data may be proportional to the change in receiver cable length C1-C4, which may be proportional to the change in reference phase offset for the receiver.

$\Delta T \; \alpha \; \Delta C1 \; \alpha \; \Delta Rpo$

The receiver hub 108 may calculate the new cable length using the difference of the receiver cable length and the initial cable length and then find the proportional change in reference phase offset for the receiver.

$Co+\Delta C=Ci$ $(Co-Ci)\alpha\Delta Rpo$

The equation may in some embodiments be reflected as:
$\Delta T \; \alpha\Delta Rpo$
for each receiver by calculating the change in temperature and the change in cable length of each receiver in a single proportion change for reference phase offset for each receiver 106.

In an embodiment in which the change in environmental data is a change in voltage, the receiver hub 108 may calculate the change in voltage determine the change in voltage meets a predetermined threshold. For example in an instance in which the predetermined threshold has been set to 10 mV, the reference voltage is 5.000V, and the received voltage is 5.012V, the difference would be 0.012V and a new environmental offset may be determined.

$|Vo-Vi|=\Delta V$ If $\Delta V>10$ mV calculate new environmental offset. The receiver hub may calculate a new environmental offset based on change in voltage as the proportional change in reference phase offset based on the change in voltage for each receiver 106. $\Delta V \; \alpha \; \Delta Rpo$ The receiver hub 108 may apply the environmental offset to the reference phase offset of the suspended reference phase offset table to dynamically adjust for the environmental changes since the suspended reference phase offset table was generated and therefore maximize the accuracy of the tag location calculations. The environmental offset for each receiver may be added to the reference phase offset of the suspended reference phase offset table in the tag location calculation as discussed in FIGS. 1 and 3. Additionally, the receiver hub 108 may update the reference environmental data with the received environmental data used to calculate the environmental offset.

Figure 5:
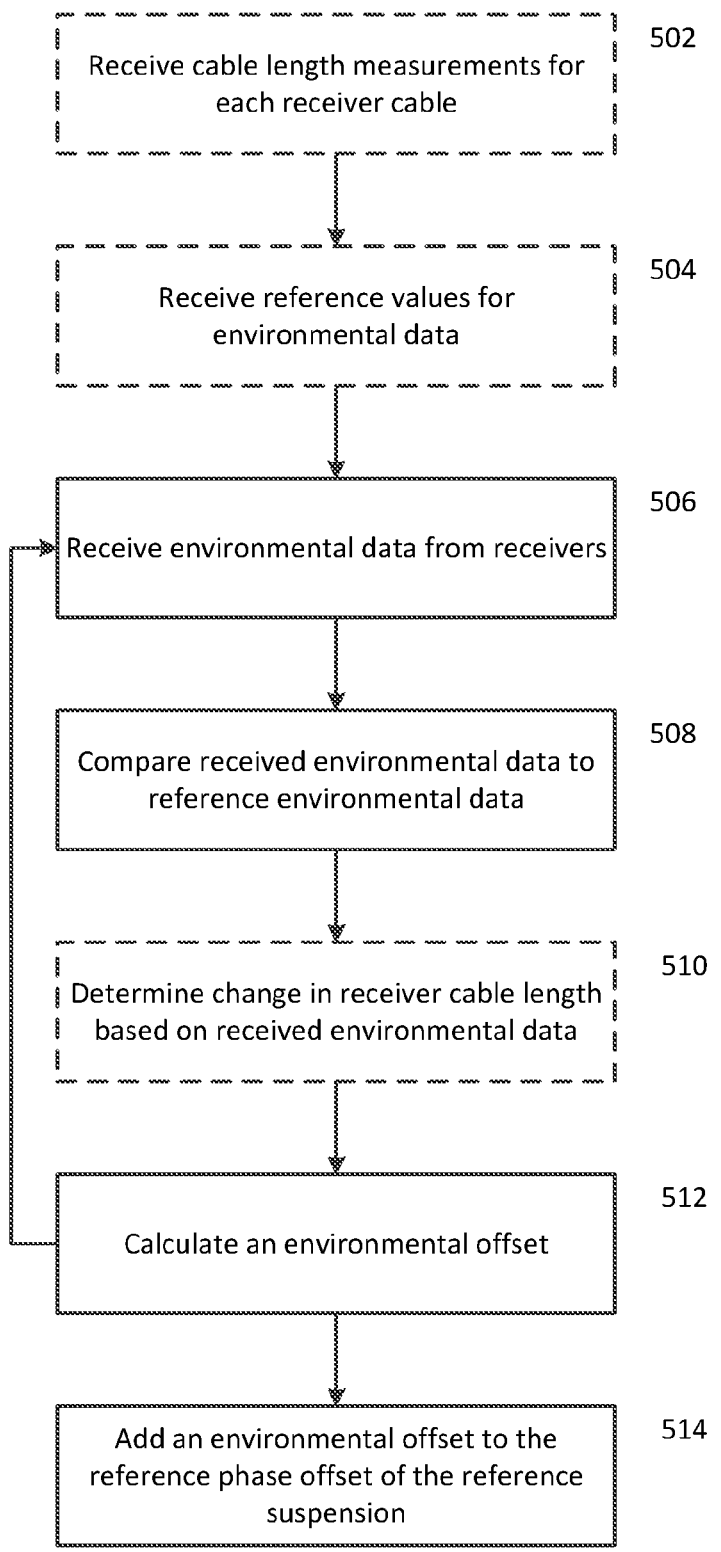
FIG. 5 illustrates a flowchart of an exemplary process for calculation and dynamic adjustment of an environmental offset in accordance with some of the example embodiments of the present invention.

Example Process for Calculation and Dynamic Adjustment of an Environmental Offset FIG. 5 illustrates a flowchart of an exemplary process for calculation and dynamic adjustment of an environmental offset in accordance with some example embodiments of the present invention. At 502, the reference module 210 may be configured to cause the processor 202 to receive cable length measurements from a communications interface 206 or a user interface 208. The receiver cable length may be entered on the user interface 208 or received by the communications interface 206 from the receivers 106, the receiver hub 108, the receiver processing and distribution system 110, or any other computing device which may measure and/or store receiver cable lengths. Each receiver cable length may entered into the reference phase offset table of the suspended reference phase offset table as the total length of receiver cabling, length of an individual receivers cabling, the length of a receiver cable in a particular daisy chain, or the like. For example, a total receiver cable length may be C1+C2+C3+C4=Cto, an individual cable length may be C1o, C2o, C3o, or C4o, and a receiver daisy chain series may be C1=Ct1o, and C2+C3+C4=Ct2o for cables depicted in FIG. 4.

At 504, the reference module may be configured to cause the processor 202 to receive reference environmental data values from the user interface 208 or the communications interface 206. The reference environmental data may be entered on the user interface 208 or received by the communications interface 206 from the receivers 106. The environmental data may be received contemporaneously with the calculation of a reference phase offset and/or generation of a suspended reference phase offset table. Environmental data may include temperature values (To), voltage values (Vo), or the like as measured at the receivers 106. The environmental data may be entered into the suspended reference phase offset table as reference environmental data as discussed in FIG. 3. For example, the communications interface 206 may receive environmental data from the receiver 106 at a predetermined interval or when requested by the processor 202 for reference phase offset calculations for suspended reference phase offset table.

At 506, environmental data is received. The reference module 210 may be configured to cause a processor 202 or communications interface 206 to receive environmental data from each receiver 106 continuously or at a predetermined interval. For example, the processor 202 may receive environmental data from the receiver 106 every 10 seconds, 30 seconds, 1 minute, 2 minutes, 10 minutes, or any other time value.

At 508, received environmental data is compared to reference environmental data. The reference module 210 may be configured to cause a processor 202 to compare the reference environmental data to the received environmental data. In an instance in which the difference between the received environmental data and the reference environmental data satisfies a predetermined threshold, the processor 202 may calculate an environmental offset at 512. For example, if the differential temperature threshold were set to 5 degrees a new environmental offset would be calculated where the reference temperature was 75 degrees and the received temperature is 81 degrees, the difference would be 6 degrees and a new environmental offset may be determined. In another example, in an instance in which the predetermined threshold has been set to 10 mV with a reference voltage of 5.000V and a received voltage of 5.012V, the difference would be 0.012V and a new environmental offset may be determined.

At 510, the reference module may be configured to cause the processor 202 to determine the change in receiver cable length based on received temperature environmental data. In an instance in which the environmental change is temperature, the processor may compensate for a change in receiver cable length C1-C4, due to changes in temperature. The processor may calculate the change in receiver cable length ($\Delta Cx$) based on the change in environmental condition ($\Delta T$). The change in temperature may be proportional to the change in receiver cable length C1-C4.

$\Delta T \, \alpha \, \Delta C1$

At 512, an environmental offset is calculated. The reference module 210 may be configured to cause a processor 202 to calculate an environmental offset. The processor may receive or calculate the difference between the reference environmental data and the received environmental data as discussed above at 508 and or receive the change to cable length ($\Delta Cx$) as discussed at 510. In some embodiments a new receiver cable length is calculated using the reference receiver cable length and the calculated change in receiver cable length. The processor 202 may calculate the proportional change to the reference phase offset of a receiver based on the change in temperature environmental data and the proportional change to cable length. Alternatively or additionally, the processor 202 may calculate the proportional change in reference phase offset for a receiver based on the change in voltage environmental data. The reference module 210 may cause the processor 202 to update the reference environmental data of the suspended reference phase offset table with the received environmental data used to calculate the environmental offset. After the processor has calculated the environmental offset the process may continue to dynamically adjust the environmental offset at 506.

At 514, an environmental offset is applied to the reference phase offset. The environmental offset for each receiver 106 may be added to the reference phase offset of the suspended reference phase offset table in subsequent tag location calculation as discussed in FIGS. 1 and 3.

Figure 6:
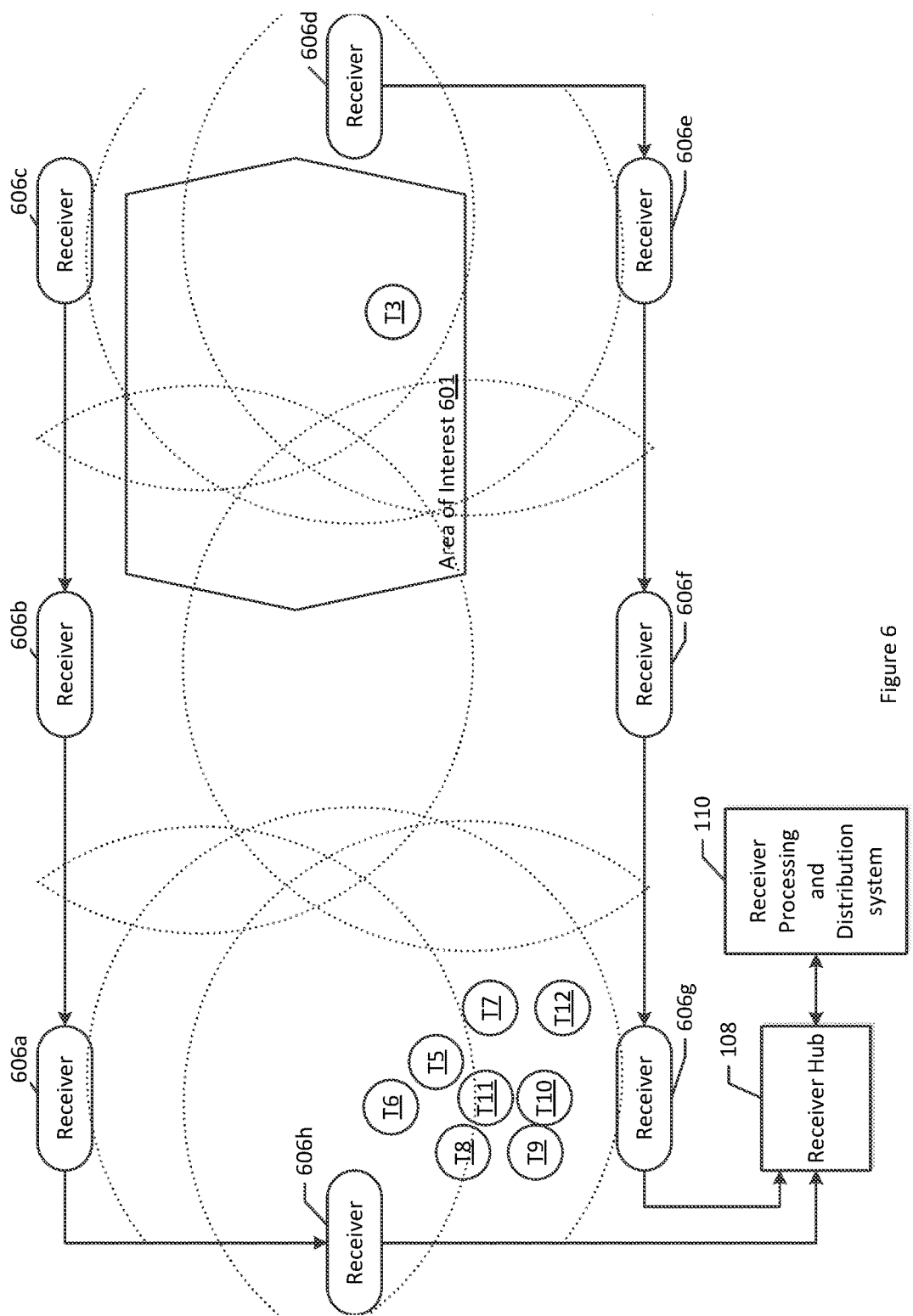
FIG. 6 illustrates an exemplary locating system which may adaptively change configuration settings based on external influences in accordance with some example embodiments of the present invention.

Example RF Locating System Configured to Adaptively Change Receiver Hub Configuration Based on External Influences FIG. 6 illustrates an exemplary radio frequency locating system which may adaptively change receiver hub configuration settings based on external influences in accordance with some embodiments of the present invention. The receiver hub 108 may be in wired or wireless (e.g. remote) communication with a receiver processing and distribution system 110. During a monitored event, receivers 606a-h may receive tag blink data from each tag T1-12 which is within the receiver's respective range depicted by dotted lines. Receivers 606a-h operate in substantially the same manner as receivers 106 as shown in FIG. 1. Tags T1-12 operate in substantially the same manner as tags 102 as described in FIG. 1. The receiver hub 108 may receive the tag blink data from each receiver 606.

The receiver hub 108 or the receiver processing and distribution system 110 may determine a configuration occurrence, indicative of an action condition in the receiver hub configuration including without limitation, excessive tag blink data, excessive receiver hub output data (e.g. tag location data), insufficient tag blink data, unstable reference, or the like. The configuration occurrence may be determined if various performance metrics such as, processing delay of the receiver hub 108, processing delay of the receiver processing and distribution system 110, processing availability, tag location accuracy, reference phase offset stability, or the like satisfy a predetermine threshold(s).

For example, the predetermined threshold for processing availability may be 15 percent, 10 percent, 5 percent, or any other processing availability value. A threshold delay or lag may be 5 seconds, 10 seconds, or any other time value. In another example receiver hub 108 or the receiver processing and distribution system 110 may identify an unstable reference in an instance in which tag data is being received at a requisite number of receivers, e.g. 3 and there is a low tag accuracy such as 1 foot, 2 feet, 5 feet, 10 feet, or any other radial distance value.

In another example, the predetermined threshold for reference phase stability may be 80 percent match between the previous 5 dynamically calculated reference phase offsets.

Excessive receiver hub 108 output data may cause congestion or delay in processing tag location data at the receiver processing and distribution system 110 or the receiver hub 108. Excessive tag blink data may cause congestion or delay in processing tag blink data at the receiver hub 108. Insufficient tag blink data may reduce tag location calculation accuracy, due to having less or insufficient blink data to calculate a location per tag 102. Unstable reference may reduce tag location calculation accuracy due to a reference tag of a reference tag/receiver pair in the reference phase offset which is being physically blocked or has RF interference, when the receiver hub 108 is dynamically calculating reference phase offsets as discussed in FIGS. 1 and 3, or a corrupted reference phase offset when a suspended reference phase offset table is being used for location calculations.

The receiver hub 108 and/or the receiver processing and distribution system 110 may identify the action condition which satisfies a predetermined threshold by comparing the monitored performance metrics to predetermined thresholds and/or combination of thresholds. For example insufficient tag data may be determined in an instance in which the tag location accuracy satisfies the predetermined tag accuracy threshold, but the tag location calculation delay and processing availability may not satisfy respective predetermined thresholds. In an example in which an excessive tag data is determined, tag location calculation delay and/or processing availability may satisfy a predetermined threshold, and the tag location accuracy may or may not satisfy a predetermined threshold. In an example embodiment in which an unstable reference is determined tag location accuracy satisfies the predetermined tag accuracy threshold, but the tag location calculation delay and processing availability may not satisfy respective predetermined thresholds. In another example embodiment in which an unstable reference is determined, dynamically calculated reference phase offsets are compared to previous reference phase offsets and fail to meet a predetermined stability threshold.

The receiver hub 108 or receiver processing and distribution system 110 may determine an receiver hub 108 configuration adjustment based on the identified action condition, such as adjusting receiver 606 range for a specified receiver, group of receivers or zone, all receivers, or terminate monitoring or use of the unstable reference. A receiver zone may comprise any group of receivers 606 which may be controlled together. For example, receivers 606*a-c* may be zone 1, 606*c-e* may be zone 2, 606*e-g* may be zone 3, and 606*g-h* and a may be zone 4.

For example and in an instance in which excessive tag data is determined, the receiver hub configuration may be adjusted by reducing the range of all receivers, receivers zones, or receivers classified as non-interested. In an example embodiment in which insufficient tag data has been identified, the receiver hub configuration may be adjusted by increasing the range of all receivers, receiver zones, or by causing receiver to be classified as interested/non-interested. In an example embodiment in which an unstable reference has been identified during a dynamic calculation of reference phase offset, the receiver hub configuration may be adjusted by terminating the monitoring of the unstable reference. In an example embodiment in which an unstable reference has been identified and tag locations are utilizing a suspended reference phase offset table, the receiver hub configuration may be adjusted by terminating use of the unstable (or corrupt) reference in the tag location data calculation.

In an instance in which the receiver hub 108 is receiving a volume of tag data which exceeds a volume threshold or fails to meet a minimum volume threshold, or the receiver hub is outputting a volume of tag location data which exceeds a volume threshold, the receiver hub 108 or the receiver processing and distribution system 110 may classify receivers 606 into interested and non-interested receivers. Interested receivers may be receivers which are in greater proximity to the tag or tags which are desired to be monitored, such as participants in the event. Non-interested tags may not be in proximity to the tags which are desired to be monitored or may have an overpopulation of tags that are not currently relevant, such as participants on the sideline or dugout during a football or baseball game.

In an alternative or additional embodiment an area of interest 601 may be defined to focus on certain identified tags, such as tags T1-12, over other tags. For example tags 1-4 may be involved in the event action or play and tags T4-T12 may be off of the event field, such as on the sidelines or dugout. The area of interest may be defined by a user by selecting an area. In some embodiments the area of interest 601 is automatically determined by the receiver hub 108 or the receiver processing and distribution system 110 based on weighting factors including the monitored area, the event field or area, the areas with tags T1-12, or the like.

Continuing with the example, the area of interest 601 contains tags T1, T2, T3, and T4 receivers 606*c-e* may be classified as interested receivers, due to their proximity to the area of interest. Receivers 606*a*, 606*g*, and 606*h* may be classified as non-interested due to the area of interest being outside of their respective ranges. Receivers 606*f* and 606*b* may be classified as either interested or non-interested receivers based on how much of the area 601 of interest is within the respective receiver's range and/or the coverage of receivers classified as interested.

The receiver hub 108 or the receiver processing and distribution system 110 may adjust the receiver hub configuration based on the identified action condition. A receiver hub configuration adjustment to receiver range may be an incremental increase or decrease a in a specified receiver's range based on the receiver hub action condition identified. The reduction or increase in receiver 606 range may be all receivers, a zone, or based on classification as interested and non-interested receivers.

In an instance in which a reference tag 104/104A is no longer monitored, the associated reference tag/receiver pair reference phase offsets may not be used for tag location calculations. In an instance in which a reference tag/receiver pair offset is corrupted in a suspended reference phase offset table, that reference tag/receiver pair offset is not used for tag location calculations.

The receiver hub 108 or receiver processing and distribution system 110 may reprocess the tag blink data or tag location data respectively in an instance in which a reference tag/receiver pair offset(s) have been removed from the reference phase offset or suspended reference phase offset table used in tag location calculations. The receiver hub 108 or the receiver processing and distribution system 110 may determine that the action condition continues to exist and determine receiver hub configuration.

Example Process for Adjusting Receiver Hub Configuration

Figure 7:
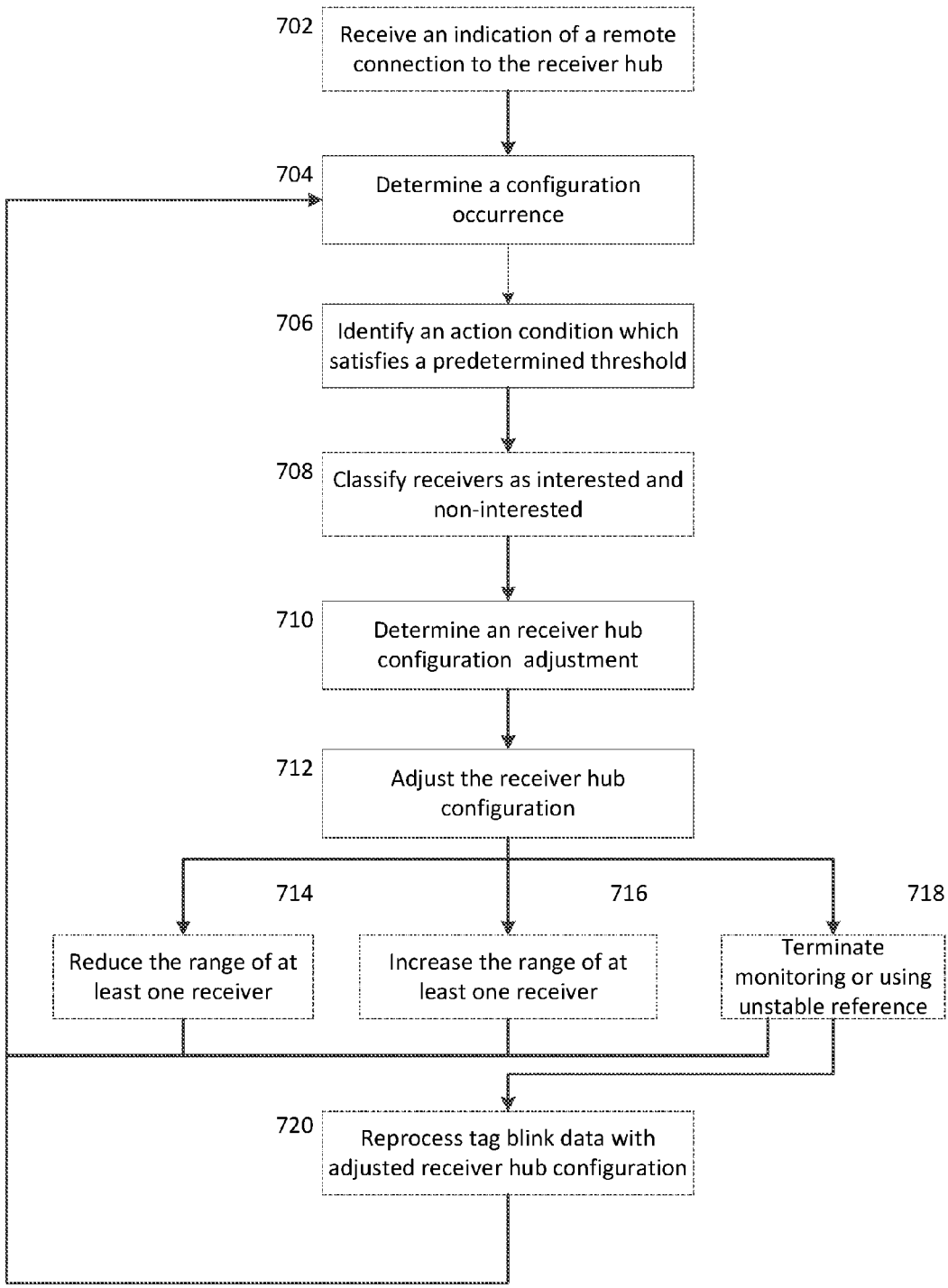
FIG. 7 illustrates a flowchart of an exemplary process for adjusting a receiver hub configuration in accordance with some example embodiments of the present invention.

FIG. 7 illustrates a flowchart of an exemplary process for adjusting a receiver hub (e.g. receiver hub 108 as shown in FIG. 6) configuration in accordance with some example embodiments of the present invention. At 702, an apparatus such as apparatus 200 as shown in FIG. 2 may have a configuration module 212 configured to cause a processor 202 to receive an indication of a remote connection with the receiver hub 108. For example in an instance in which the apparatus 200 is a receiver processing and distribution system (e.g. receiver processing and distribution system 110 as shown in FIG. 6), the processor 202 may cause the receiver processing and distribution system 110 to establish a remote connection with the receiver hub 108 and the processor may receive an indication of the remote connection with the receiver hub through a communications interface 206.

At 704, the configuration module 212 may cause the processor 202 to determine a configuration occurrence. A configuration occurrence may be an indication of an action condition. An action condition may include without limitation, excessive tag blink data, excessive tag location data, insufficient tag blink data, an unstable reference, or the like. An action condition may be indicated by performance metrics including without limitation, low processing availability, lag or delay between the receipt of tag blink data and calculation of tag location, low tag location accuracy, low reference phase offset stability, or the like which satisfy a predetermined threshold.

At 706, the configuration module 212 may cause the processor 202 to identify an action condition which satisfies a predetermined threshold. The action condition may be identified by comparing monitored performance metrics to predetermined thresholds and/or combinations of thresholds. For example insufficient tag data may be determined in an instance in which the tag location accuracy satisfies the predetermined tag accuracy threshold, but the tag location calculation delay and processing availability may not satisfy respective predetermined thresholds. In an example in which an excessive tag data is determined, tag location calculation delay, and/or processing availability satisfy a predetermined threshold, and the tag location accuracy may or may not satisfy a predetermined threshold.

In an example embodiment in which an unstable reference is determined tag location accuracy satisfies the predetermined tag accuracy threshold, but the tag location calculation delay and processing availability may not satisfy respective predetermined thresholds. Additionally or alternatively, the processor 202 may identify an insufficient tag blink data in an instance in which there is a low tag location accuracy due to the tag blink data for a tag or tags 102 not being receiver by enough receivers, e.g. two receivers. In another example the processor 202 may identify an unstable reference in an instance in which tag data is being received at a requisite number of receivers, e.g. 3 and there is allow tag accuracy such as 1 foot, 2 feet, 5 feet, 10 feet, or any other radial distance value. In another example the processor may identify an unstable reference in an instance in which the dynamically calculated reference phase offset or series of reference phase offsets fail to meet a stability threshold when compared to previous reference phase offsets.

At 708, the configuration module 212 may cause the processor 202 to classify receivers as interested or non-interested. In instances in which excessive or insufficient tag data is determined the receivers (e.g. receivers 606a-h) may be classified as interested or non-interested. Interested receivers may be receivers which are in greater proximity to the tag or tags (e.g. tag T1-12) which are desired to be monitored, such as participants in the event. Non-interested receivers 606 may not be in proximity to the tags 102 which are desired to be monitored or may have an overpopulation of tags that are not currently relevant, such as participants on the sideline or dugout during a football or baseball game.

Additionally, or alternatively, the processor 202 may identify an area of interest (e.g. area of interest 601) and receivers 606 which may receive T1-12 blink data from the specified area of interest. For example, in an instance in which the area of interest 601 contains tags T1, T2, T3, and T4, receivers 606c-e may be classified as interested receivers, due to their proximity to the area of interest. Receivers 606a, 606g, and 606h may be classified as non-interested due to the area of interest being outside of their respective ranges. Receivers 606f and 606b may be classified as either interested or non-interested receivers based on how much of the area 601 of interest is within the respective receiver's range and/or the coverage of receivers classified as interested.

At 710, the configuration module 212 may cause the processor 202 to determine an adjustment to the receiver hub configuration. The processor 202 may determine a new range for one or more receivers or which reference tag/receiver pairs of the reference phase offset or suspended reference phase offset table to use in a tag location calculation. For example the processor 202 may have determined that there is insufficient tag blink data and determine the adjustment to the receiver hub configuration is an increase the range of one receiver, a receiver zone, all receivers, or receivers classified as interested.

In another example the processor 202 may have determined that there is excessive tag blink data or tag location data and determine the adjustment to the receiver hub configuration is a decrease in range of one receiver, a receiver zone, all receivers, or receivers classified as non-interested.

In some embodiments in which the processor 202 has determined that there is an unstable reference and the reference phase offset is dynamically calculated, the processor may determine which reference tag/receiver pairs of the reference phase offset to use in the calculation of tag location by terminating the monitoring of the unstable reference tag 104/104A.

In some embodiments in which the processor 202 has determined that there is an unstable reference and the reference phase offset is stored in a suspended reference phase offset table, the processor may determine which reference tag/receiver pairs of the reference phase offset in the suspended reference phase offset table to use in the calculation of tag location by terminating the use of the corrupt reference tag/receiver pair offset.

At 712 the configuration module 212 may cause the processor 202 to cause an adjustment to the receiver hub configuration. The processor 202 may cause the receiver hub 108 to cause the increase or decrease in receiver range, or terminate the monitoring and/or use of an unstable reference as determined at 710. Examples of adjusting the receiver hub configuration are provided at 714, 716, and 718.

At 714, the configuration module 212 may cause the processor 202 to cause one or more receivers 606a-h to reduce the respective specified receiver's range. The processor 202 may cause the reduction of the specified receiver range at the receiver 606. For example the processor 202 may cause the reduction in receiver range of a single receiver, such as receiver 606a; a receiver zone such as zone 1 receivers 606a-c; all receivers 606a-h; or non-interested receivers such as receives 606a, 606g, and 606h of the example from 708. In some example embodiments the processor 202 may cause the reduction of receiver range for specified receivers at the receiver hub 108. After the processor 202 has adjusted the receiver hub configuration, the processor may continue the process at 704.

At 716, the configuration module 212 may cause the processor 202 to cause one or more receivers 606a-h to increase the respective specified receiver's range. The processor 202 may cause the increase in receiver range at the specified receiver 606. For example the processor 202 may cause the increase of the receiver range of a single receiver, such as receiver 606a; a receiver zone, such as zone 1 receivers 606 a-c; all receivers 606a-h; or interested receivers such as receivers c-e of the example from 708. In some embodiments the processor 202 may cause the increase of receiver range for specified receivers at the receiver hub 108. After the processor 202 has adjusted the receiver hub configuration, the processor may continue the process at 704.

At 718, the configuration module 212 may cause the processor 202 to cause the receiver hub 108 to terminate monitoring or using an unstable reference. The processor 202 may terminate monitoring of an unstable reference tag in an instance in which the reference phase offset is dynamically calculated. In an instance in which the reference phase offset is stored as a suspended reference phase offset table, the processor may terminate using the unstable or corrupt reference tag/receiver pair offset for location calculations. After the processor 202 has adjusted the receiver hub configuration, the processor may continue the process at 704.

At 720, the reference module 212 may cause the processor 202 to reprocess the tag blink data which was received during the configuration occurrence with the adjusted receiver hub configuration, in an instance in which the processor has terminated monitoring or using an unstable reference, after reprocessing the tag blink data the processor 202 may continue the process at 704.

Example Process for Calculating a Secondary Reference Offset

Figure 9:
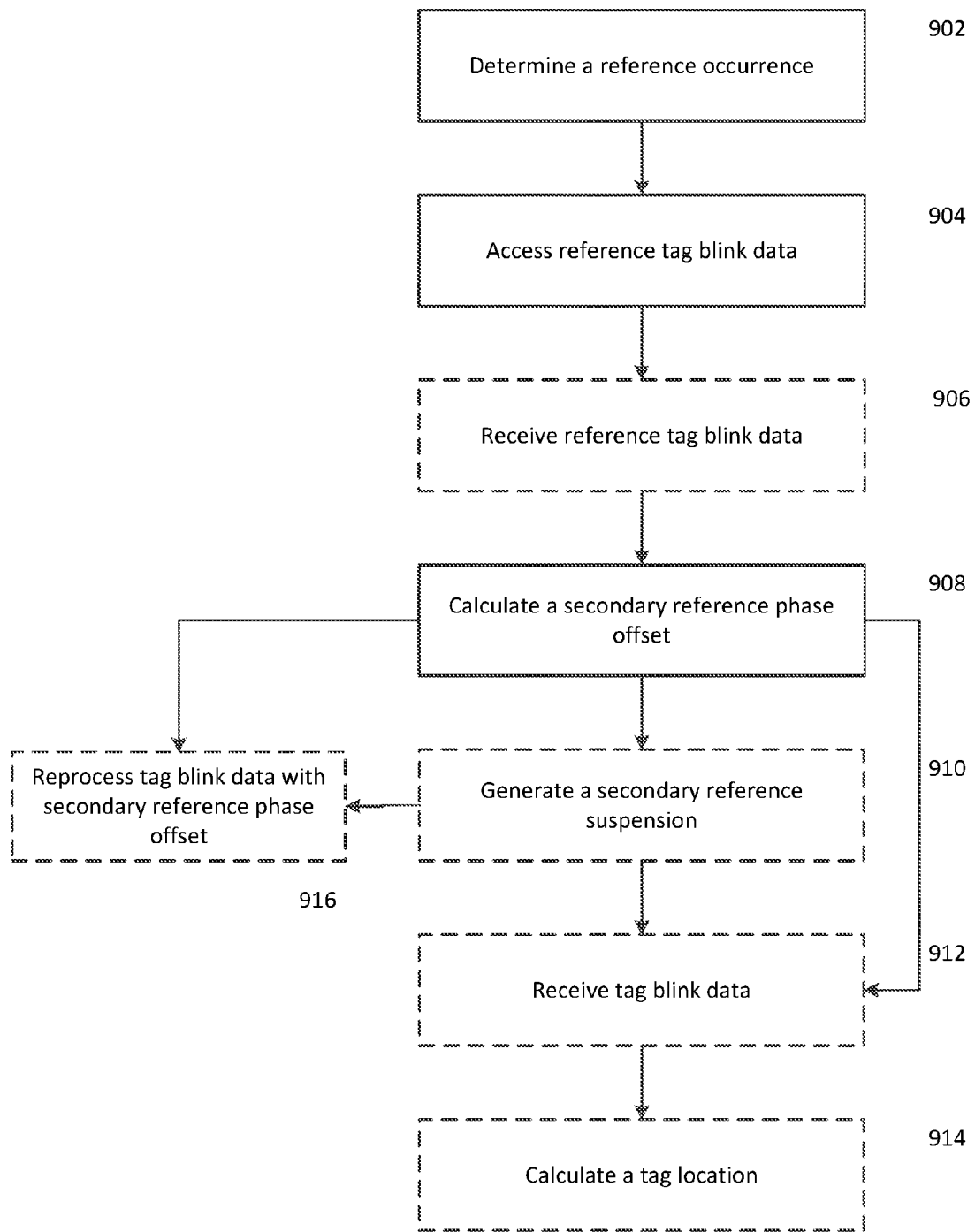
FIG. 9 illustrates a flowchart of an exemplary process for calculating a secondary reference offset in accordance with some example embodiments of the present invention.

FIG. 9 illustrates a flowchart of an exemplary process for calculating a secondary reference offset in accordance with some example embodiments of the present invention. At 902, an apparatus, such as apparatus 200 as shown in FIG. 2, may have a reference module 210 configured to cause a processor 202 to determine a reference occurrence indicative of a primary suspended reference phase offset table failure. A primary suspended reference phase offset table failure may include, without limitation, the complete loss of the suspended reference phase offset table data, the loss of a portion of the suspended reference phase offset table data, corruption of the suspended reference phase offset table data, loss of calibration of the suspended reference phase offset table, or the like. The processor 202 may monitor various system parameters to determine a reference occurrence, such as, system power, receiver (e.g. receiver 106) power, tag location calculation accuracy, receiver alignment and/or stability, tag location calculation program errors, or the like.

A loss of primary reference calibration may be identified by low tag location accuracy, loss of power to the system or to one or more receivers, or movement of a receiver. A complete or partial loss of the primary suspended reference phase offset table may be identified by calculation program errors, system power failure and/or the like.

In an instance in which tag location accuracy for the monitored area or a portion of the monitored area meets a predetermined threshold, the processor may determine a reference occurrence. For example, if the tag location accuracy for the monitored area is 70 percent a reference occurrence may be determined. In another example, if the tag location accuracy for a zone is 60 percent a reference occurrence may be determined.

A loss of system or receiver power may be sufficient to determine a reference occurrence or used as a factor when analyzing other parameters. For example, if a receiver or group of receivers loses power, a reference occurrence may be determined. In another example, the tag location accuracy threshold may be lowered when a loss of power to a receiver or the system has been detected, such as 70 percent tag location accuracy for a portion of the monitored area may cause a reference occurrence to be determined.

In an instance in which the receivers 106 are equipped with stability or alignment circuitry, the processor 202 may determine a reference occurrence based on the stability or alignment circuitry detecting movement of a receiver. Stability or alignment circuitry may include without limitation, trembler switches, liquid switches, bearing switches, level switches, pressure switches, or the like which may detect impact or movement of a receiver 106. Additionally or alternatively, detection of receiver movement may be a factor in the determination of a reference occurrence. For example, if a receiver was bumped or moved by equipment or personnel, the trembler, pressure, liquid, bearing, and/or level switches may detect the impact and the processor 202 may determine a reference occurrence. In another example, the tag location accuracy threshold may be lowered when a movement of a receiver has been detected, such as 70 percent tag location accuracy for a portion of the monitored area may cause a reference occurrence to be determined.

Tag location calculation program errors may cause the processor to determine a reference occurrence has occurred. For example if the primary suspended reference phase offset table data cannot be located, cannot be opened, is corrupted (completely or partially), or other program errors which would indicate that the primary suspended reference phase offset table is no longer available for tag location calculations.

At 904, the reference module 210 may be configured to cause the processor 202 to access blink data associated with reference tags (e.g. reference tags 104/104A.) The reference tags 104/104A may transmit blink data throughout the monitored event regardless of whether the reference tag blink data is received or utilized. Reference tag blink data may be received and ignored (e.g. not selected), not monitored, or used for a dynamic reference phase crosscheck during normal operations. If not selected or monitored at the time of the reference occurrence, the processor 202 may cause the reference tags 104/104A to be selected and/or monitored. In an alternative embodiment in which the reference tags 104/104A are not transmitting at the time of the reference occurrence, the processor 202 may cause an activation signal to be transmitted by a transceiver of the communications interface 206 to initiate the reference tag blink data transmissions.

At 906, the reference module 210 may be configured cause the processor 202 to receive reference tag blink data, from the receivers 106.

At 908, the reference module 210 may be configured to cause the processor 202 to calculate a secondary reference phase offset based on the reference tag blink data. In some examples, the reference tag blink data is different from the reference tag blink data. At 910, the reference module 210 may be configured cause the processor 202 to generate a secondary suspended reference phase offset table. At 912, the reference module 210 may be configured to cause the processor 202 to receive tag blink data from the receivers 106. At 914, the reference module 210 may be configured to cause the processor 202 to calculate a tag location. The processor 202 may calculate tag location using the dynamically calculated secondary reference phase offset which is substantially the same as calculating a tag location using the dynamically calculated reference phase offset as discussed in FIG. 1. In an alternative or additional embodiment, the processor 202 may calculate tag location using the secondary suspended reference phase offset table.

At 916, the reference module 210 may be configured to cause the processor 202 to reprocess tag blink data (e.g., tag blink data received prior to or during the determination of the reference occurrence) with the secondary phase offset for the purpose of calculating location data. The processor 202 may reprocess (e.g. calculate tag location) tag data which was received during the reference occurrence (e.g. stored in memory during the reference occurrence). The processor 202 may retrieve the tag blink data from memory 204 and reprocess the tag blink data. The reprocessing of the tag blink data may occur at a later time (e.g. after the event being monitored), or as soon as the reference occurrence has been resolved (e.g. a secondary reference phase offset or suspended reference phase offset table has been calculated or generated.)

In some example embodiments, the processor 202 may reprocess the tag blink data using the secondary reference phase offset which was calculated as close to the time the tag blink data was received. Alternatively or additionally, the processor 202 may reprocess the tag blink data using the reference phase offset of the secondary suspended reference phase offset table.

Example Process for Determining a Receiver Error

Figure 10:
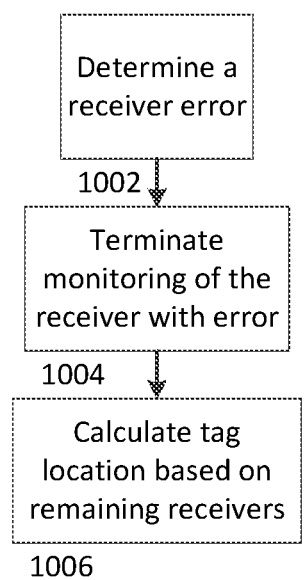
FIG. 10 illustrates a flowchart of an exemplary process for determining a receiver error in accordance with an example embodiment of the present invention.

FIG. 10 illustrates an exemplary process for determining a receiver error in accordance with an example embodiment of the present invention. At 1002, an apparatus, such as apparatus 200 as shown in FIG. 2, may have a reference module 210 configured to cause the communication interface 206 to receive a receiver error indication from one or more receivers, such as receivers 106. The receiver error indication may be an error code generated by the receiver 106, such as loss of power, out of alignment or unstable in instance in which the receiver is equipped with alignment or stability circuitry, high or low temperature, power supply fault, e.g. low or high voltage, ground detection, or the like. Each error code may be associated with a specific binary, alphanumerical, or other reference code. In an example embodiment, a single error code may be utilized for all receiver errors. The communications interface 206 may transmit the receiver error to the processor 202 for further processing.

At 1004 the reference module 210 may be configured to cause the processor 202 to determine a receiver error. The processor 202 may determine a receiver error based on a receiver error indication. The processor may compare the received receiver error indication code to an error table. In an instance in which the error indications matches a error code in the error table the processor 202 may determine a receiver error.

Additionally or alternatively, the processor may determine receiver error based on data received or not received from the receivers 106. For example, the processor may determine a receiver error based on an unstable communication signal, or loss of communication, an availability signal, or the like. The processor 202 may compare the data received form the receivers to a predetermined threshold, such as bytes per minute. The processor 202 may determine for each respective receiver the total bytes received each 60 second period and compare the received data rate to the predetermined threshold. In an instance in which a receiver or receivers fail to satisfy the predetermined threshold, the processor 202 may determine that the communication signal is unstable or has been lost and determine a receiver error has occurred.

In an instance in which the receiver is configured with an availability signal, the processor 202 may determine a receiver error in response to the availability signal not being received.

At 1006 the reference module 210 may be configured to cause the processor to terminate monitoring of the receiver 106 with the error. The processor 202 may receive data from the receiver 106 with the error, but not process the data.

In some example embodiments, the data from the receiver with the error may be stored in a memory 204 for later system analysis and troubleshooting.

At 1008 the reference module 210 may be configured to cause the processor 202 to calculate tag locations based on the remaining receiver data. The processor 202 may calculate the tag locations, as described in FIG. 1, using the tag blink data from the remaining receivers.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contem- That which is claimed:

1. A method comprising:
receiving reference tag blink data from a plurality of receivers;
calculating, using a processor, a reference phase offset between the plurality of receivers;
analyzing a plurality of reference phase offset calculations for at least one reference tag receiver pair over a time interval; and
generating a suspended reference phase offset table in an instance in which the plurality of reference phase offset calculations for the at least one reference tag receiver pair satisfy a stability threshold, wherein a suspended reference phase offset table is generated by causing the reference phase offset to be stored in a memory for later tag location calculations.

2. The method of claim 1, wherein the reference phase offset is the difference between a reference clock time at receipt of the reference tag blink data at a respective plurality of receivers.

3. The method of claim 1, further comprising:
receiving tag blink data; and
calculating tag location data, wherein calculating the tag location data is based on a time difference of arrival of the tag blink data at the plurality of receivers and adding the reference phase offset of the suspended reference phase offset table.

4. The method of claim 1, further comprising determining a radio frequency receiving period with low radio frequency interference, wherein the radio frequency receiving period comprises a period in which radio frequency interference satisfies a predetermined threshold.

5. The method of claim 1, further comprising determining a radio frequency receiving period with low physical interference, wherein the radio frequency receiving period comprises a period in which physical interference satisfies a predetermined threshold.

6. An apparatus comprising a processor and a memory including computer program code, the memory and computer program code configured to, with the processor, cause the apparatus to:
receive reference tag blink data from a plurality of receivers;
calculate a reference phase offset between the plurality of receivers;
analyze a plurality of reference phase offset calculations for at least one reference tag receiver pair over a time interval; and
generate a suspended reference phase offset table in an instance in which the plurality of reference phase offset calculations for the at least one reference tag receiver pair satisfy a stability threshold, wherein a suspended reference phase offset table is generated by causing the reference phase offset to be stored in a memory for later tag location calculations.

7. An apparatus according to claim 6, wherein the reference phase offset is the difference between a reference clock time at receipt of the reference tag blink data at a respective plurality of receivers.

8. An apparatus according to claim 6, wherein the memory and computer program code are further configured to, with the processor, cause the apparatus to:
receive tag blink data; and
calculate a tag location data, wherein calculating the tag location data is based on a time difference of arrival of the tag blink data at the plurality of receivers and adding the reference phase offset of the suspended reference phase offset table.

9. An apparatus according to claim 6, wherein the memory and computer program code are further configured to, with the processor, cause the apparatus to determine a radio frequency receiving period with low radio frequency interference, wherein the radio frequency receiving period comprises a period in which radio frequency interference satisfies a predetermined threshold.

10. An apparatus according to claim 6, wherein the memory and computer program code are further configured to, with the processor, cause the apparatus to determine a radio frequency receiving period with low physical interference, wherein the radio frequency receiving period comprises a period in which physical interference satisfies a predetermined threshold.

11. A computer program product comprising a non-transitory computer readable medium having program code portions stored thereon, the program code portions configured, upon execution to:
receive reference tag blink data from a plurality of receivers;
calculate a reference phase offset between the plurality of receivers;
analyze a plurality of reference phase offset calculations for at least one reference tag receiver pair over a time interval; and
generate a suspended reference phase offset table in an instance in which the plurality of reference phase offset calculations for the at least one reference tag receiver pair satisfy a stability threshold, wherein a suspended reference phase offset table is generated by causing the reference phase offset to be stored in a memory for later tag location calculations.

12. A computer program product according to claim 11, wherein the reference phase offset is the difference between a reference clock time at receipt of the reference tag blink data at a respective plurality of receivers.

13. A computer program product according to claim 11, wherein the program code portions are further configured, upon execution, to:
receive tag blink data; and
calculate tag location data, wherein calculating the tag location data is based on a time difference of arrival of the tag blink data at the plurality of receivers and adding the reference phase offset of the suspended reference phase offset table.

14. A computer program product according to claim 11, wherein the program code portions are further configured, upon execution, to determine a radio frequency receiving period with low radio frequency interference, wherein the radio frequency receiving period comprises a period in which radio frequency interference satisfies a predetermined threshold.

15. A computer program product according to claim 11, wherein the program code portions are further configured, upon execution, to determine a radio frequency receiving period with low physical interference, wherein the radio frequency receiving period comprises a period in which physical interference satisfies a predetermined threshold.

* * * * *